US012636902B2

(12) United States Patent
Iwasawa et al.

(10) Patent No.: US 12,636,902 B2
(45) Date of Patent: May 26, 2026

(54) BOOKLET MANUFACTURING APPARATUS THAT MANUFACTURES BOOKLET BY ADHERING PLURALITY OF SHEETS

(71) Applicant: CANON KABUSHIKI KAISHA, Tokyo (JP)

(72) Inventors: Yusaku Iwasawa, Shizuoka (JP); Kenji Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/786,738

(22) Filed: Jul. 29, 2024

(65) Prior Publication Data

US 2025/0042192 A1 Feb. 6, 2025

(30) Foreign Application Priority Data

Aug. 2, 2023 (JP) ................................ 2023-126436

(51) Int. Cl.

| | |
|---|---|
| ***B42C 9/00*** | (2006.01) |
| ***B42C 13/00*** | (2006.01) |
| ***B42C 19/02*** | (2006.01) |
| ***G03G 15/00*** | (2006.01) |

(52) U.S. Cl.

CPC ............ *B42C 9/0081* (2013.01); *B42C 13/00* (2013.01); *B42C 19/02* (2013.01); *G03G 15/6544* (2013.01); *G03G 2215/00835* (2013.01)

(58) Field of Classification Search

CPC ....... B42C 9/0081; B42C 13/00; B42C 19/02; G03G 15/6544; G03G 2215/00835

See application file for complete search history.

(56) References Cited

U.S. PATENT DOCUMENTS

2024/0393726 A1 * 11/2024 Kataoka ............. G03G 15/6582

FOREIGN PATENT DOCUMENTS

JP 2004209859 A 7/2004

OTHER PUBLICATIONS

Extended European Search Report issued in European Appln. No. 24191661.8, mailed Dec. 10, 2024.

* cited by examiner

*Primary Examiner* — David H Banh

(74) *Attorney, Agent, or Firm* — ROSSI, KIMMS & McDOWELL LLP

(57) ABSTRACT

A heater heats sheets to which a powder adhesive has been applied in a binding margin. A pressing member manufactures a booklet by applying pressure to the sheets. In a first adhesion mode, an application amount of the powder adhesive applied to the binding margin is a first application amount and a heat parameter proportional to an amount of heat applied to the sheets is a first value. In a second adhesion mode, the application amount of the powder adhesive applied to the binding margin is a second application amount and the heat parameter is a second value. The first value is higher than the second value. The first application amount is lower than the second application amount.

26 Claims, 12 Drawing Sheets

FIG. 2A
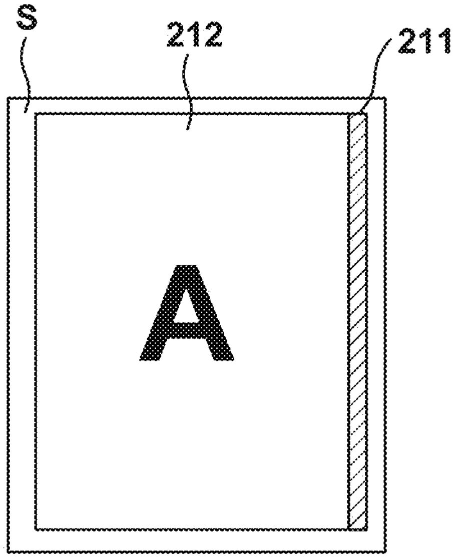
FIG. 2B
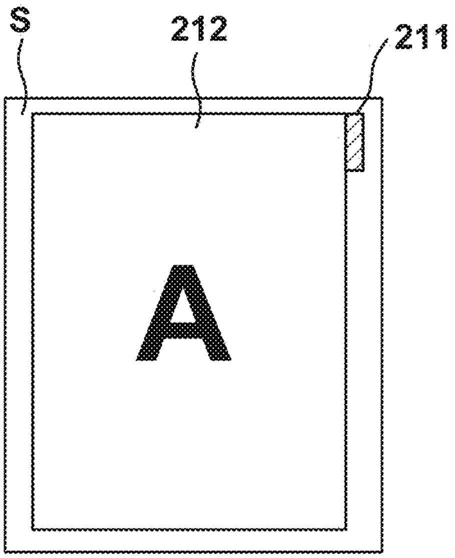
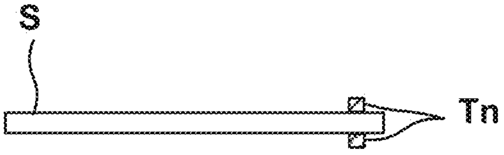
FIG. 2C

FIG. 8A
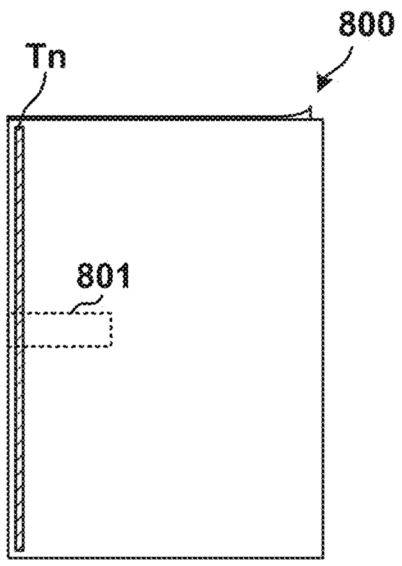
FIG. 8B
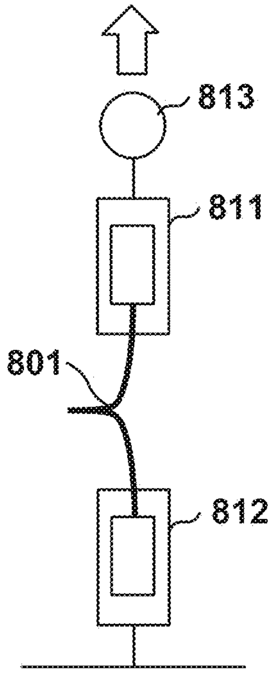
FIG. 9
| | COMPARATIVE EXAMPLE I | COMPARATIVE EXAMPLE II | EMBODIMENT |
|---|---|---|---|
| APPLICATION AMOUNT [mg/cm$^2$] | 0.45 | 0.40 | 0.40 |
| ADHESION TIME [sec] | 2.0 | 2.0 | 3.0 |
| ADHESION STRENGTH [N/cm] | 1.0 (OK) | 0.8 (NG) | 1.0 (OK) |
| TONER CONSUMPTION [mg] | 195 | 189 | 189 |

BOOKLET MANUFACTURING APPARATUS THAT MANUFACTURES BOOKLET BY ADHERING PLURALITY OF SHEETS

BACKGROUND OF THE INVENTION

Field of the Invention

The present invention relates to a booklet manufacturing apparatus that manufactures a booklet by adhering a plurality of sheets.

Description of the Related Art

A booklet manufacturing apparatus manufactures a booklet by using a motorized stapler to staple together a plurality of sheets onto which images have been printed. However, using metal staples makes it difficult to recycle such booklets. Japanese Patent Laid-Open No. 2004-209859 proposes a post-processing apparatus that manufactures a booklet by adhering a plurality of sheets to each other using a powder adhesive.

Incidentally, there is demand to apply the Sustainable Development Goals (SDGs) to booklet manufacturing apparatuses as well. In particular, there is a need to improve the environmental performance of booklet manufacturing apparatuses, such as reducing the amount of powder adhesive used to manufacture booklets, reducing the frequency with which components used in the booklet manufacturing apparatus need to be replaced, and the like.

SUMMARY OF THE INVENTION

The Disclosure provides a booklet manufacturing apparatus comprising: a heater configured to heat a plurality of sheets to which a powder adhesive has been applied in a binding margin of each of the sheets; a pressing member configured to manufacture the booklet by applying pressure to the plurality of sheets heated by the heater; and a controller configured to control the heater and the pressing member. The controller has a first adhesion mode and a second adhesion mode. The first adhesion mode is a mode in which an application amount of the powder adhesive applied to the binding margin is a first application amount and a heat parameter proportional to an amount of heat applied to the plurality of sheets by the heater is a first value. The second adhesion mode is a mode in which the application amount of the powder adhesive applied to the binding margin is a second application amount and the heat parameter is a second value. The first value is higher than the second value. The first application amount is lower than the second application amount.

Further features of the present invention will become apparent from the following description of exemplary embodiments (with reference to the attached drawings).

BRIEF DESCRIPTION OF THE DRAWINGS

FIGS. 2A to 2C are diagrams illustrating adhesive toner applied to a binding margin.

FIGS. 8A and 8B are diagrams illustrating a testing method.

FIG. 9 is a diagram illustrating test results.

DESCRIPTION OF THE EMBODIMENTS

Figure 1:
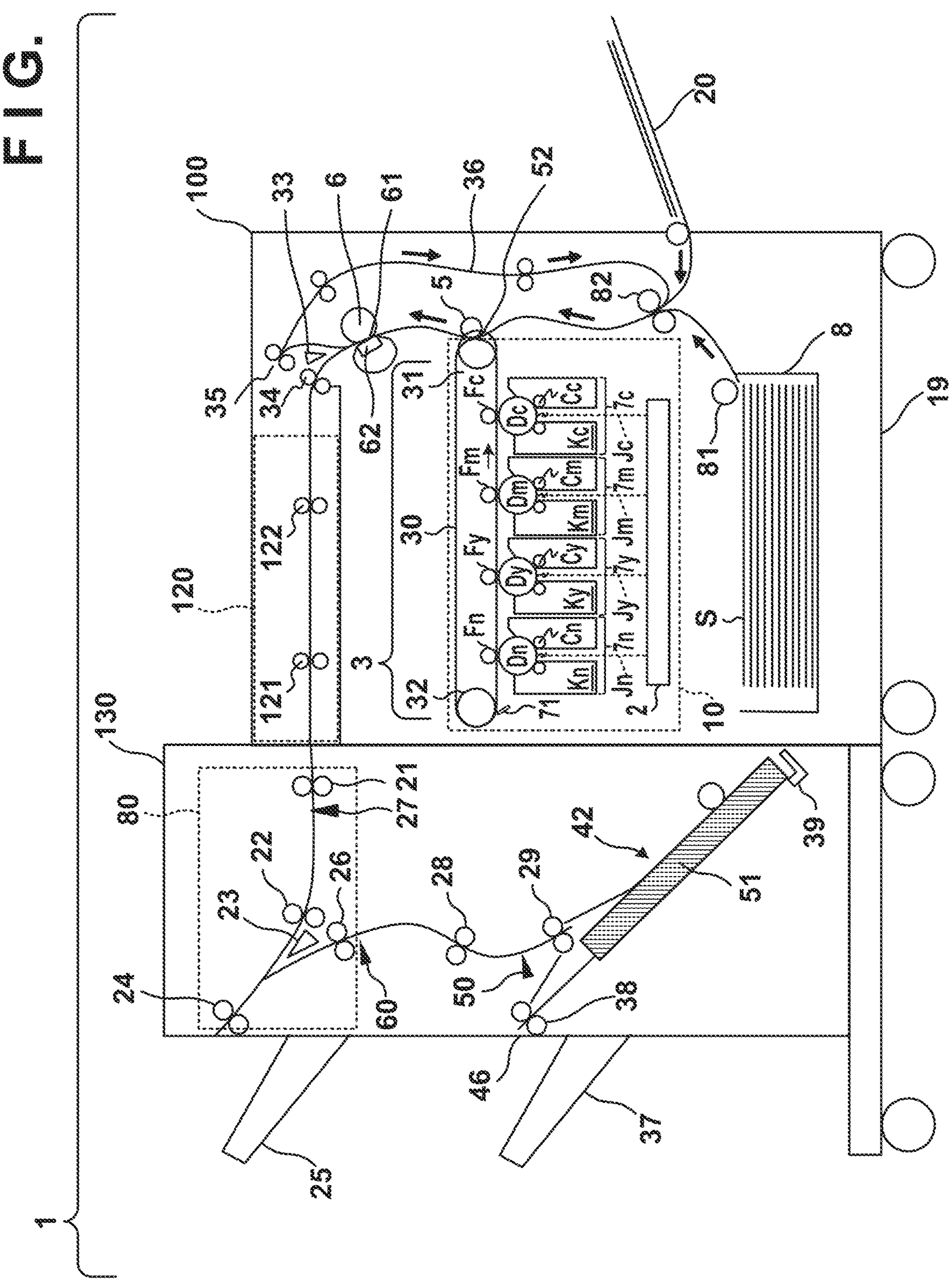
FIG. 1 is a diagram illustrating an image forming system (a booklet manufacturing apparatus).

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

(1) Image Forming System

As illustrated in FIG. 1, an image forming system 1 includes an image forming apparatus 100 and a post-processing apparatus 130. The post-processing apparatus 130 is a sheet processing apparatus connected to the image forming apparatus 100. The image forming apparatus 100 forms an image on a sheet S, which is a recording material. An intermediate conveyance unit 120 conveys the sheet S on which the image has been formed to the post-processing apparatus 130. The post-processing apparatus 130 performs post-processing on the sheet S and outputs the processed sheet as necessary. Note that the image forming system 1 may be understood as being a booklet manufacturing apparatus, or the post-processing apparatus 130 may be understood as being a booklet manufacturing apparatus.

The image forming apparatus 100 includes a sheet cassette 8, an image forming section 10, a fixing apparatus 6, and a housing 19 that houses these components. The image forming section 10 forms a toner image on the sheet S fed from the sheet cassette 8. The fixing apparatus 6 executes fixing processing for fixing the toner image onto the sheet S.

The sheet cassette 8 is provided in a lower part of the image forming apparatus 100. The sheet cassette 8 is inserted into the housing 19 so as to be removable therefrom, and can hold a large number of sheets S. In the present embodiment, the maximum size for the sheet S on which an image can be formed is assumed to be A4 size (297 mm in height×210 mm in width). The long side of the A4-size sheet S is parallel to a conveyance direction of the sheet S. A feed roller 81 feeds the sheet S from the sheet cassette 8 and passes the sheet S to a conveyance roller pair 82. A multi-tray 20 can also feed the sheets S one at a time.

The image forming section 10 is a tandem-type electrophotographic unit provided with four process cartridges 7*n*, 7*y*, 7*m*, and 7*c*, an exposure apparatus 2, and a transfer unit 3. "y", "m", and "c" stand for "yellow", "magenta", and "cyan", respectively. "n" refers to a powder adhesive. The powder adhesive will be called "adhesive toner Tn" hereinafter, for example. The letters "n", "y", "m", and "c", indicating the colors of the toner, may be omitted from the reference signs. The adhesive toner may be transparent or black. If the adhesive toner is transparent, black (process black) is realized by mixing yellow, magenta, and cyan as appropriate. The toner type (material) used as the yellow, magenta, and cyan toners and the adhesive toner is, for example, a thermoplastic resin. Thermoplastic resins include, for example, polyester resin, vinyl resin, acrylic resin, styrene acrylic resin, and the like. The process cartridges 7*n*, 7*y*, 7*m*, and 7*c* enable a plurality of components that handle the image forming process to be replaced collectively. In other words, a plurality of components are integrated to form the process cartridges 7*n*, 7*y*, 7*m*, and 7*c*.

The process cartridges 7*n*, 7*y*, 7*m*, and 7*c* include corresponding developing apparatuses Kn, Ky, Km, and Kc, photosensitive drums Dn, Dy, Dm, and Dc, and charging rollers Cn, Cy, Cm, and Cc. The structures of the process cartridges 7*n*, 7*y*, 7*m*, and 7*c* are substantially the same as each other, except for the types of toner used therein.

Each of the developing apparatuses Ky, Km, and Kc includes a container containing a powder (e.g., toner) and an application roller (application sleeve) for applying the powder to the photosensitive drums Dn, Dy, Dm, and Dc. More specifically, the developing apparatuses Ky, Km, and Kc contain yellow, magenta, and cyan toners, respectively, for forming a visible image on the sheet S. The developing apparatus Kn contains the adhesive toner Tn. The adhesive toner Tn forms a user image (original image), and is used in the post-processing apparatus 130 for thermocompression bonding of a plurality of the sheets S. Note that an image of the adhesive toner Tn is formed on the photosensitive drum Dn as a result of being developed by the adhesive toner Tn.

The image forming section 10 may include a fifth process cartridge using an adhesive-only or black toner. Note that the types of printing toner and the number of types can be changed in accordance with the purpose of the image forming apparatus 100.

The charging rollers Cn, Cy, Cm, and Cc are chargers, and uniformly charge the surfaces of the corresponding charging rollers Cn, Cy, Cm, and Cc. The exposure apparatus 2 is disposed below the process cartridges 7*n*, 7*y*, 7*m*, and 7*c*, and above the sheet cassette 8. The exposure apparatus 2 forms an electrostatic latent image by irradiating the photosensitive drums Dn, Dy, Dm, and Dc with corresponding laser beams Jn, Jy, Jm, and Jc. The exposure apparatus 2 may be called an "optical scanning apparatus".

The developing apparatuses Kn, Ky, Km, and Kc form toner images by causing the toner to adhere to the electrostatic latent images on the photosensitive drums Dn, Dy, Dm, and Dc. The developing apparatuses Kn, Ky, Km, and Kc may be called "developing apparatuses".

The transfer unit 3 includes a transfer belt 30 serving as an intermediate transfer member (a secondary image carrier). The transfer belt 30 is an endless belt stretched upon an inner roller 31 and a tension roller 32. An outer circumferential surface (image forming surface) of the transfer belt 30 faces the photosensitive drums Dn, Dy, Dm, and Dc. Primary transfer rollers Fn, Fy, Fm, and Fc are disposed on an inner circumferential side of the transfer belt 30 so as to face the photosensitive drums Dn, Dy, Dm, and Dc.

The primary transfer rollers Fn, Fy, Fm, and Fc transfer toner images from the corresponding photosensitive drums Dn, Dy, Dm, and Dc to the transfer belt 30. The primary transfer rollers Fn, Fy, Fm, and Fc may be called "primary transfer devices". When the transfer belt 30 rotates counterclockwise, the toner images are conveyed to a secondary transfer part.

A secondary transfer roller 5 is disposed opposite the inner roller 31, and a transfer nip 52 is formed between the secondary transfer roller 5 and the transfer belt 30. The transfer nip 52 transfers the toner image from the transfer belt 30 to the sheet S. The transfer nip 52 may be called a "secondary transfer part". A cleaning blade 71 is a cleaning member for removing toner remaining on the transfer belt 30. Toner removed by the cleaning blade 71 is collected into a collection container (not shown).

The fixing apparatus 6 is disposed above the secondary transfer roller 5 (downstream in the conveyance direction of the sheet S). The fixing apparatus 6 applies heat and pressure to the sheet S as the sheet S traverses a fixing nip 61. The toner images are fixed onto the sheet S as a result. Note that the fixing apparatus 6 includes a fixing heater 62 for heating the toner images and the sheet S. The fixing heater 62 is a halogen heater or a ceramic heater, for example.

As illustrated in FIG. 1, a switching guide 33 is a flap-shaped guide member provided downstream from the fixing apparatus 6 in the conveyance direction of the sheet S. When a single-sided printing mode, in which an image is formed on one surface of the sheet S, is selected, the switching guide 33 guides the sheet S to discharge rollers 34. When a double-sided printing mode, in which an image is formed on both surfaces of the sheet S, is selected, the switching guide 33 guides the sheet S having an image formed on a first surface to a switchback roller pair 35. The switchback roller pair 35 conveys the sheet S in a first direction. When a following end of the sheet S can enter a double-sided conveyance path 36, the switchback roller pair 35 starts to reverse. As a result, the sheet S is conveyed to the double-sided conveyance path 36. The double-sided conveyance path 36 conveys the sheet S to the secondary transfer part again. An image is formed on a second surface of the sheet S as a result.

The discharge rollers 34 convey the sheet S to the intermediate conveyance unit 120. The intermediate conveyance unit 120 has conveyance roller pairs 121 and 122. The conveyance roller pairs 121 and 122 convey the sheet S to the post-processing apparatus 130.

(2) Post-Processing Apparatus

The post-processing apparatus 130 is a floor-standing sheet processing apparatus. The post-processing apparatus 130 has a function for buffering a plurality of sheets, a function for aligning a plurality of sheets, and a function for adhering a sheet bundle.

In the following, the end of the sheet S on the front side thereof in the conveyance direction will be called a "leading end". Similarly, the end of the sheet S on the rear side thereof in the conveyance direction will be called a "following end". Of the two ends of the sheet S, the end that enters the post-processing apparatus 130 first will be called a "first end". Meanwhile, of the two ends of the sheet S, the end that enters the post-processing apparatus 130 later will be called a "second end". Note that switch-back conveyance performed by the post-processing apparatus 130 may result in the leading end changing from the first end to the second end and the following end changing from the second end to the first end.

The sheet S conveyed from the intermediate conveyance unit 120 is passed to inlet rollers 21 of the post-processing apparatus 130. A sheet sensor 27, called an "inlet sensor", is disposed downstream from the inlet rollers 21. When the sheet sensor 27 senses the following end of the sheet S, a conveyance roller pair 22 accelerates the sheet S. When the following end of the sheet S for which the discharge destination is set to an upper tray 25 reaches an area between the conveyance roller pair 22 and a conveyance roller pair 24, the conveyance roller pair 22. As a result, the conveyance speed of the sheet S is set to a predetermined discharge speed. The conveyance roller pair 22 discharges the sheet S to the upper tray 25.

When the following end of the sheet S for which the discharge destination is set to a lower tray 37 passes a backflow prevention member 23, the conveyance roller pair 22 stops conveying the sheet S. The conveyance roller pair 22 then begins rotating in reverse. As a result, the sheet S is switched back and conveyed to a conveyance roller pair 26. When a sheet sensor 60 provided downstream from the conveyance roller pair 26 senses the leading end of the sheet S, the two rollers constituting the conveyance roller pair 24 separate from each other. This enables the conveyance roller pair 24 to accept a subsequent sheet S. Furthermore, the conveyance roller pair 26 stops in a state where the preceding sheet S is pinched between the conveyance roller pair 26. When the subsequent sheet S arrives, the conveyance roller pair 26 starts rotating in reverse. The subsequent sheet S is overlaid onto the preceding sheet S as a result. When the conveyance roller pair 26 repeats the switchback of the sheets S, a plurality of the sheets S are stacked and a sheet bundle is formed. Such an operation for forming a sheet bundle may be called a "buffering operation". A unit that implements the buffering operation is called a "buffer section 80". Note that it is not necessary to form the sheet bundle using the buffer section 80. For example, the buffer section 80 may switch back the sheet S that has arrived from the image forming apparatus 100, and then convey the sheet S to an intermediate stacking section 42. In this case, a sheet bundle is formed in the intermediate stacking section 42.

When the sheet bundle is completed in the buffer section 80, the conveyance roller pair 26 conveys the sheet bundle toward the intermediate stacking section 42. The sheet bundle traverses a conveyance roller pair 28 and a sheet sensor 50. Furthermore, the sheet bundle is conveyed to the intermediate stacking section 42 by a kick-out roller 29. A longitudinal alignment plate 39, which is movable, is disposed in a standby position, at a part of the intermediate stacking section 42 that is furthest downstream. When the sheet bundle presses against the longitudinal alignment plate 39, the sheet bundle is aligned.

A plurality of sheet bundles are stacked in order on the intermediate stacking section 42. As a result, a predetermined number of sheets S that are to form a booklet are stacked on the intermediate stacking section 42. Once a predetermined number of sheets S have been aligned, a booklet is formed by a thermocompression bonding unit 51 performing a binding operation (thermocompression bonding processing). The longitudinal alignment plate 39 moves from the standby position to a discharge position, and as a result, the booklet is pushed toward discharge rollers 38. Once the leading end of the booklet is pinched by the discharge rollers 38, the longitudinal alignment plate 39 stops and then returns to the standby position. The booklet received from the longitudinal alignment plate 39 is discharged to the lower tray 37 from a discharge port 46 by the discharge rollers 38.

The foregoing described the post-processing apparatus 130 as forming a sheet bundle constituted by a plurality of sheets S by using the buffer section 80, and conveying the sheet bundle to the intermediate stacking section 42. However, a single sheet S may be conveyed to the intermediate stacking section 42.

(3) Printing Region of Adhesive Toner Tn

FIG. 2A illustrates a printing region 211 of the adhesive toner Tn. The printing region 211 is secured in the binding margin of the sheet S. In this example, the printing region 211 extends parallel to the long side of the sheet S. The printing region 211 is provided at an end near the long side. As a result, by overlaying a plurality of sheets S and then heating and pressurizing the printing regions 211 of the plurality of sheets S, the post-processing apparatus 130 adheres the plurality of sheets S to each other to form a booklet. In this case, the booklet is bound on the long side. Here, the width (the length in the short side direction) of the adhesive toner image (the printing region 211) is 4.0 mm, for example. For example, the amount of toner per unit area of the adhesive toner Tn (i.e., the loading amount) may be 0.45 $mg/cm^2$.

As illustrated in FIG. 2B, a small printing region 212 for the adhesive toner Tn may be formed near a corner of the sheet S. A booklet bound at the corner is produced as a result. The image of the adhesive toner Tn is not formed on the sheet S that serves as the cover of the booklet.

As illustrated in FIG. 2C, the printing region 211 of the adhesive toner Tn may be formed on both surfaces of the sheet S, or may be formed on only one surface of the sheet S. For example, whether the printing region 211 of the adhesive toner Tn is formed on only one surface or on both surfaces can be selected in consideration of the adhesive performance of the post-processing apparatus 130, the adhesive performance of the adhesive toner Tn, the type of the sheet S, the purpose of the booklet, and the like. Reliable adhesion is necessary for booklets that will be handled as archival editions. Reliable adhesion is also necessary when heavy paper or a special sheet S is used for the cover of the booklet. Accordingly, in these cases, the printing region 211 of the adhesive toner Tn is provided on both surfaces of the sheet S. However, when manufacturing a simple booklet for temporary use, the printing region 211 of the adhesive toner Tn is formed on only one surface of the sheet S.

When the adhesive toner Tn is applied to both surfaces of the sheet S, the adhesive toner Tn formed on the front surface of one sheet S and the adhesive toner Tn formed on the back surface of another sheet S are placed in contact with and adhered to each other. Note that the adhesive toner Tn is applied to the back surface of the front cover of the booklet and the front surface of the back cover of the booklet, but is not applied to the front surface of the front cover of the booklet, nor to the back surface of the back cover of the booklet.

(4) Booklet Manufacturing Operations

FIGS. 3A to 3D illustrate booklet manufacturing operations performed by the intermediate stacking section 42. The initial state is a state in which the intermediate stacking section 42 is empty. As an example, a sheet bundle W constituted by five sheets S is conveyed from the buffer section 80 to the intermediate stacking section 42. The intermediate stacking section 42 first functions as a support member that supports the five sheets S.

A Y direction is a direction parallel to a stacking surface (stacking plate) of the intermediate stacking section 42 on which the sheets S are stacked, and parallel to the conveyance direction of the sheets S conveyed from the kick-out roller 29 to the intermediate stacking section 42. The Y direction may be called a "longitudinal direction". An X direction is a direction parallel to the stacking surface of the intermediate stacking section 42 on which the sheets S are stacked, and orthogonal to the Y direction. The X direction may also be called a "lateral direction". AZ direction is a direction orthogonal to the X direction and the Y direction (the normal direction of the stacking surface; the thickness direction of the stacked sheets S). The Z direction may also be called a "height direction". The opposite directions for the X direction, the Y direction, and the Z direction may be called the "−X direction", the "−Y direction", and the "−Z direction", respectively.

The longitudinal alignment plate 39 and a longitudinal alignment roller 40 function as a first alignment unit that aligns a plurality of the sheets S in a first direction (the Y direction). The longitudinal alignment plate 39 is disposed at the part of the intermediate stacking section 42 furthest downstream in the Y direction. The longitudinal alignment plate 39 is a reference member (first reference member) that serves as a reference for a sheet position in the Y direction. The longitudinal alignment roller 40 is a conveyance member that conveys the sheets S in the Y direction in order to align the sheets S by pressing the sheets S against the longitudinal alignment plate 39. The longitudinal alignment plate 39 includes a plurality of contact parts 39*a* to 39*c* disposed at intervals in the X direction. The plurality of contact parts 39*a* to 39*c* make contact with the ends of the sheets S. The longitudinal alignment plate 39 and the longitudinal alignment roller 40 are integrally configured as a movable unit 59 capable of moving in the Y direction. The movable unit 59 can move in the Y direction using a drive source such as a motor. In other words, the positions of the longitudinal alignment plate 39 and the longitudinal alignment roller 40 in the Y direction can be adjusted. Lateral alignment joggers 41*a* to 41*c* function as a second alignment unit that aligns the sheets in a second direction orthogonal to the first direction (that is, in the X direction).

The lateral alignment joggers 41*a* to 41*c* move in the X direction using a drive source such as a motor, and press the side ends of the sheets S stacked on the intermediate stacking section 42. Lateral alignment plates 72*a* and 72*b* are reference members that serve as a reference for the position of the sheets S in the X direction. The lateral alignment plates 72*a* and 72*b* are disposed opposite the lateral alignment joggers 41*a* and 41*b* in the X direction.

(4-1) Preparation Stage

Figure 3B:
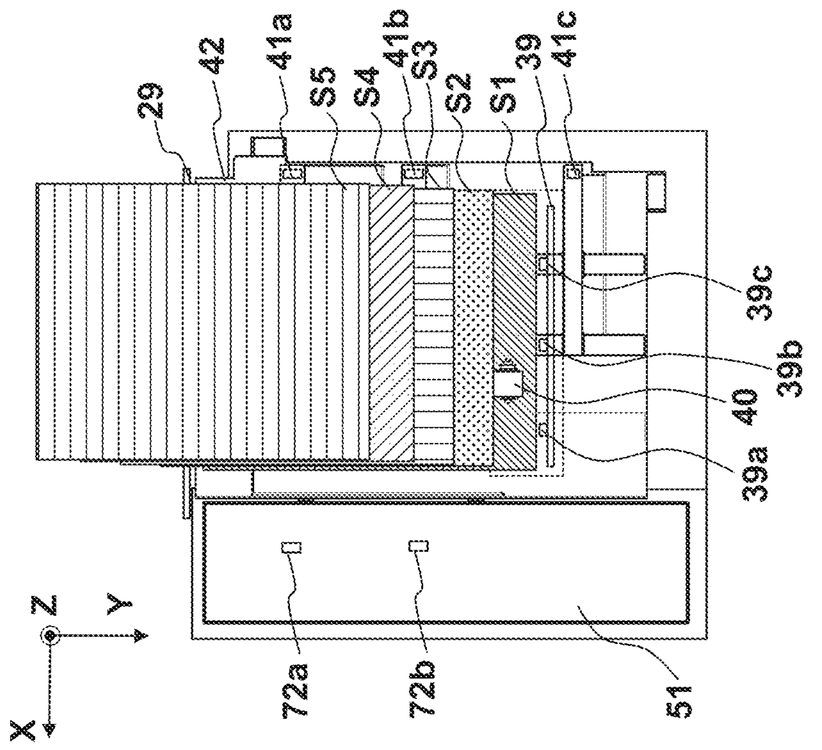
FIGS. 3A to 3D are diagrams illustrating alignment processing.
Figure 3A:
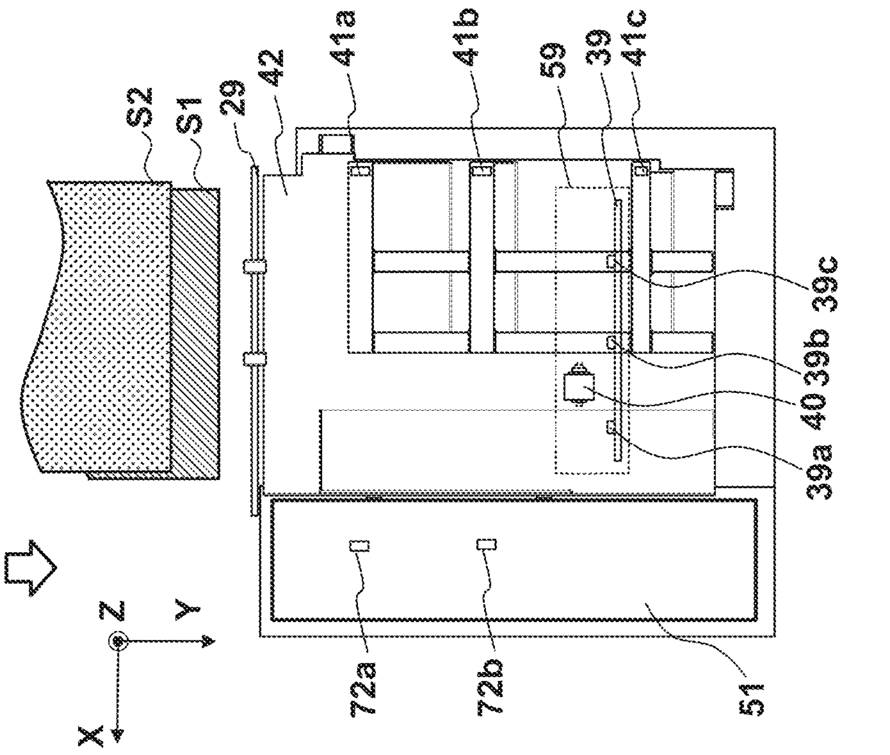

As illustrated in FIG. 3A, sheets S1 to S5 are conveyed toward the kick-out roller 29. The sheets S1 to S5 may be conveyed to the intermediate stacking section 42 in a state in which a sheet Si positioned lower protrudes further in the Y direction than a sheet Si+1 positioned higher. Here, i is an index of the sheets S. Before the sheets S are stacked on the intermediate stacking section 42, the longitudinal alignment plate 39 moves to a predetermined standby position in advance in accordance with the size of the sheets S to be aligned. The standby position is set such that the end position of the sheet S in the −Y direction is constant regardless of the size of the sheets S. In other words, the standby position is a position at which the distance, in the Y direction, from the nip position of the kick-out roller 29 to the longitudinal alignment plate 39 is slightly longer than the length of the sheets in the Y direction. The lateral alignment joggers 41*a* to 41*c* stand by in a position on the outer side, in the X direction, of the sheets S being conveyed, so as not to interfere with the conveyance of the sheets S.

(4-2) Longitudinal Alignment Stage

FIG. 3B illustrates the following end of the first sheet S1 having exited the nip of the kick-out roller 29, and the leading end of the sheet S1 having reached the longitudinal alignment roller 40. The sheet S1 is pressed against the longitudinal alignment plate 39, and is aligned according to the position of the longitudinal alignment plate 39. When the longitudinal alignment roller 40 continuously rotates, the sheets S2 to S5 that reach the longitudinal alignment roller 40 after the sheet S1 are pressed against the longitudinal alignment plate 39 in order. As a result, the five sheets S1 to S5 are aligned in the Y direction (the longitudinal direction) according to the position of the longitudinal alignment plate 39.

(4-3) Lateral Alignment Stage

Figure 3D:
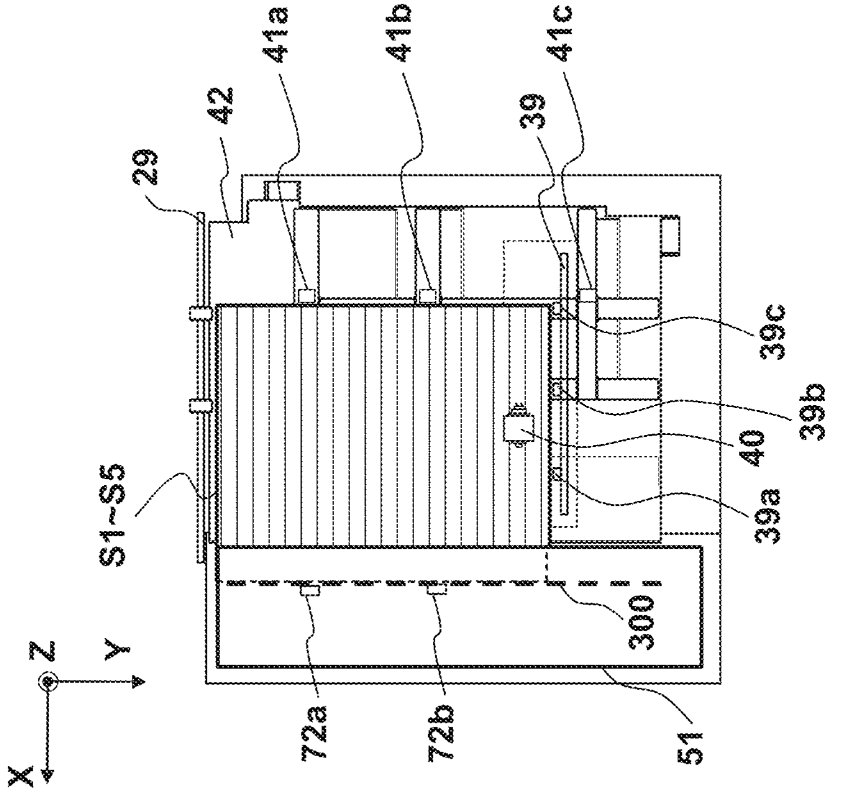
Figure 3C:
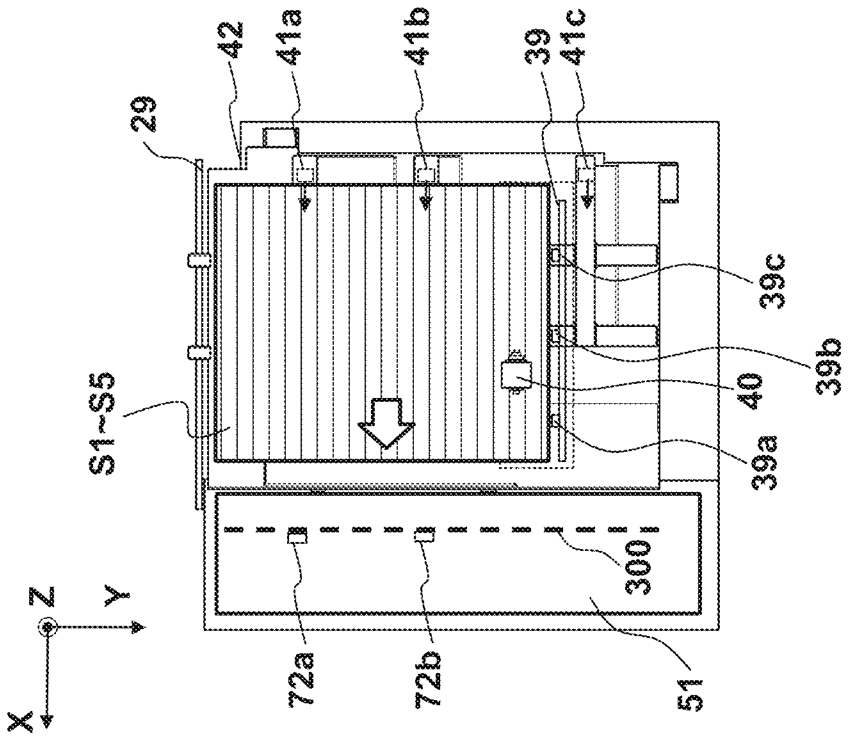

FIG. 3C illustrates the alignment of the sheets S1 to S5 in the X direction (the lateral direction) having started after the alignment in the Y direction (the longitudinal direction) is complete. The lateral alignment joggers 41*a* to 41*c* are driven in the X direction, which corresponds to the alignment direction, make contact with the side ends of the sheets S1 to S5, and press the sheets S1 to S5 toward the lateral alignment plates 72*a* and 72*b*. The other side ends of the sheets S1 to S5 make contact with contact surfaces 300 of the lateral alignment plates 72*a* and 72*b*, and the sheets S1 to S5 are aligned in the X direction (the lateral direction) according to the positions of the lateral alignment plates 72*a* and 72*b*.

(4-4) Adhesion Stage (Thermocompression Bonding Stage)

FIG. 3D illustrates a state in which the alignment of the five sheets S1 to S5 in the X direction and the Y direction is complete. A target position in the alignment operations (an alignment position) is the position of the sheet bundle W when adhesion processing (thermocompression bonding) is performed by the thermocompression bonding unit 51. As described above, the image forming apparatus 100 applies the adhesive toner Tn to the sheets S1 to S5 such that the sides on which the adhesive toner image is formed correspond to the side on which the thermocompression bonding unit 51 is located. However, if the sheet S1 is the cover of the booklet, the adhesive toner Tn is not applied.

The thermocompression bonding unit 51 performs a thermocompression bonding operation on the aligned sheets S1 to S5. During this time, the lateral alignment joggers 41*a* to 41*c* retract in the −X direction. As a result, the intermediate stacking section 42 enters a state in which the next plurality of sheets S can be accepted. The sheet bundle W constituted by sheets S6 to S10, formed by the buffer section 80, is then stacked on the sheets S1 to S5.

The four stages described above are then repeated for the sheets S1 to S10. As a result, the sheets S1 to S10 are adhered in a state in which the sheets S1 to S10 are aligned with a high level of accuracy.

For example, the sheet bundle W is constituted by five sheets S. However, the number of sheets S constituting the sheet bundle W may be two, three, or the like. In other words, the number of sheets S included in the sheet bundle W may be any number less than or equal to the maximum number of sheets S that can be stacked in the buffer section 80.

(5) Thermocompression Bonding Unit

Figure 4A:
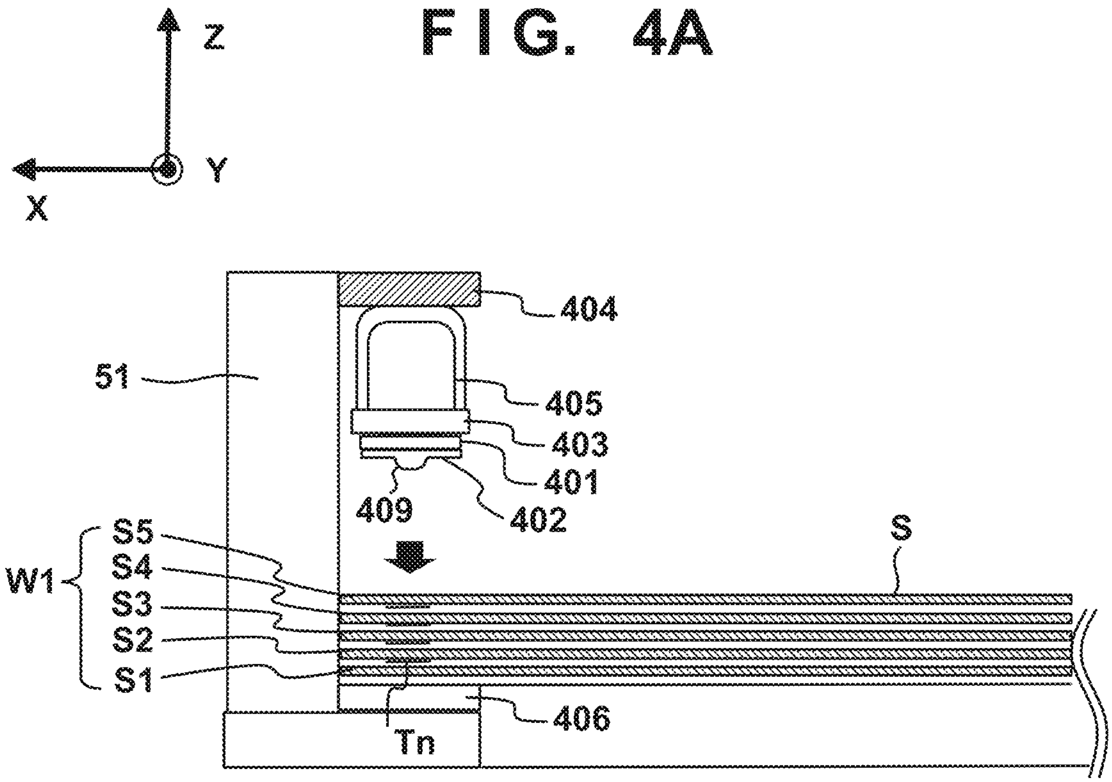
FIGS. 4A to 4B are diagrams illustrating adhesion processing.

As illustrated in FIG. 4A, the thermocompression bonding unit 51 includes a heater 401 having a heating element as a heat source, and an aluminum heating plate 402 disposed thereon. The heater 401 is 1.0 mm thick, for example. The heating plate 402 is 1.5 mm thick, for example. The heater 401 is a ceramic heater, for example. The heating temperature of the heater 401 may be measured by a temperature sensor and controlled by a control circuit such that the measured temperature becomes a target temperature. For example, a target temperature (e.g., 240° C.) is set such that the surface temperature of a pressurizing part 409 of the heating plate 402 is 200° C. Providing the heating plate 402 with the pressurizing part 409 concentrates the heat and pressure of the thermocompression bonding unit 51 at a binding position of the sheet bundle W. This improves the heating and pressurization efficiency.

The heater 401 is supported by a heater support member 403 made of a resin. A pressurizing lever 404 is powered by a motor M1, illustrated in FIG. 5, to push the thermocompression bonding unit 51 in the −Z direction (the downward direction) and pressurize the sheet bundle W. The pressure of the pressurizing lever 404 is transmitted to the pressurizing part 409 through a metal stay 405, which is a rigid body. The pressure of the pressurizing lever 404 can be controlled according to the amount by which the pressurizing lever 404 is moved in the −Z direction (the downward direction). For example, the average contact pressure acting on the sheet bundle W is 0.2 Mpa.

A pressurizing plate 406 is a receiving member formed from an elastic material (e.g., silicon rubber). An elastic material is used because the pressurizing plate 406 is a member for receiving pressure in a stable manner. The pressurizing plate 406 is 2.0 mm thick, for example. The thermocompression bonding unit 51 pressurizes a sheet bundle W1 constituted by the sheets S1 to S5, and then separates from the sheet bundle W1. The sheets S1 to S5 in FIG. 4A are illustrated as the first to fifth sheets of a booklet serving as a finished product. The sheet S1 is the cover of the booklet. Accordingly, no image of the adhesive toner Tn is formed on the sheet S1. Images of the adhesive toner Tn are formed on the bottom surfaces of the second and subsequent sheets S2 to S5 of the booklet.

Figure 4B:
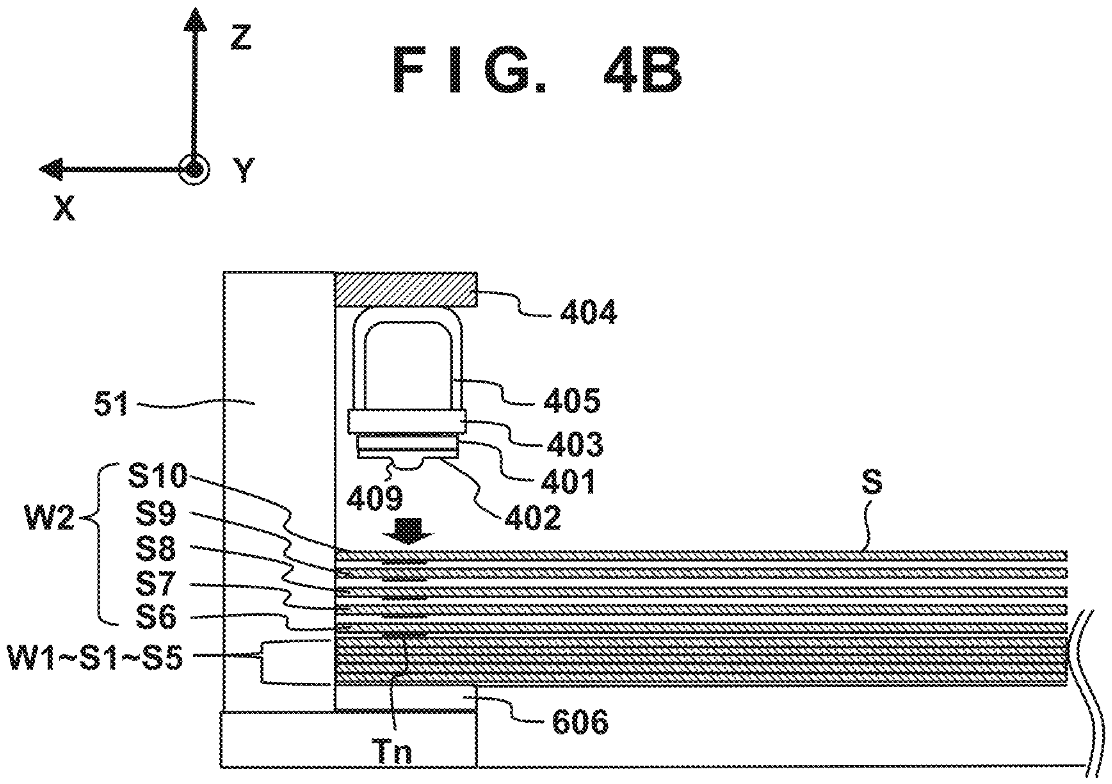

As illustrated in FIG. 4B, a sheet bundle W2 is stacked on the sheets S1 to S5 for which the thermocompression bonding is complete. The sheet bundle W2 is constituted by the sheets S6 to S10. The thermocompression bonding unit 51 performs the thermocompression bonding operation on the sheet bundle W2 stacked on the sheet bundle W1. A booklet constituted by a large number of sheets S is produced as a result.

The sheets S6 to S10 that are stacked later are included in the same booklet as the sheets S1 to S5. As such, images of the adhesive toner Tn are formed on each of the bottom surfaces of the sheets S6 to S10.

As one example, the post-processing apparatus 130 can produce a partial booklet constituted by a maximum of 100 sheets S. When the production of the booklet is started, the buffer section 80 buffers a maximum of five sheets S at a time to create sheet bundles W, and supplies the sheet bundles W to the intermediate stacking section 42. The thermocompression bonding unit 51 performs the thermocompression bonding operations, which include a descending operation, a pressurizing operation, and an ascending operation, each time a sheet bundle W arrives. By repeating the buffering operation and the thermocompression bonding operations, an efficient booklet is produced without impairing the productivity of the image forming apparatus 100.

When the thermocompression bonding operations are completed for the sheet bundle W including the last page of the booklet in the intermediate stacking section 42, the longitudinal alignment plate 39 moves from the standby position to the discharge position. In other words, the completed booklet is discharged by the longitudinal alignment plate 39 moving parallel toward the discharge port 46. The discharge port 46 is provided with the discharge rollers 38. Once the leading end of the booklet passes the discharge rollers 38 slightly, the longitudinal alignment plate 39 stops and then returns to the standby position. The discharge rollers 38 discharge the booklet to the lower tray 37.

(6) Adhesion Control

(6-1) Basic Concept

A booklet produced using the adhesive toner Tn is easily recyclable. Reducing the amount of adhesive toner Tn used to produce the booklet would improve the environmental performance of the image forming system 1. However, reducing the amount of adhesive toner Tn may also degrade the adhesive properties in the booklet, which can result in the adhered plurality of sheets S separating from each other. A method which reduces the amount of adhesive toner Tn used while maintaining the adhesive properties in the booklet is therefore needed.

The environmental performance of the image forming system 1 may also be improved from other viewpoints. For example, adhesion control may be implemented which can extend the lifespan of consumable members used by the thermocompression bonding unit 51 (e.g., the heater 401 and the pressurizing plate 406).

In other words, reducing the amount of adhesive toner Tn used or extending the lifespan of the consumable members used by the thermocompression bonding unit 51 improves the environmental performance of the image forming system 1. It is also important to maintain the usability of the image forming system 1. For example, the number of sheets S on which the image forming system 1 forms an image per unit of time is sometimes called the "image forming speed" or "throughput". Therefore, maintaining the throughput to the greatest extent possible will also maintain the usability.

In the following, of a plurality of control parameters that affect the adhesive properties, at least one control parameter is set to improve the adhesive properties, and at least one other control parameter is set to improve the environmental performance (reduce the adhesive properties). In other words, balancing the at least two control parameters maintains the adhesive properties and improves the environmental performance of the image forming system 1. There are various combinations for the at least two control parameters. Several combinations will therefore be described below.

(6-2) Combination of Adhesion Time and Amount of Adhesive Toner Applied

In the first embodiment, "adhesion time" refers to the time required for the thermocompression bonding unit 51 to heat and pressurize the adhesive toner Tn. "Amount of adhesive toner Tn applied" refers to the amount of the adhesive toner Tn applied to the binding margin of the sheet S. Note that reducing the amount of adhesive toner Tn applied degrades the adhesive properties. On the other hand, longer adhesion times improve the adhesive properties. Accordingly, the adhesive properties are maintained by balancing the reduction in the amount of adhesive toner Tn applied with the increase in the adhesion time.

(6-3) Downtime

A longer adhesion time reduces the throughput of the image forming apparatus 100. Accordingly, when downtime arises in the image forming apparatus 100, the amount of adhesive toner Tn applied is reduced, and the adhesion time is extended. Note that "downtime" refers to the time when a toner image cannot be formed on a sheet S. For example, downtime is delay time that arises when the intervals between instances of image formations are extended or image formation is temporarily stopped to reduce defects when the image forming apparatus 100 is forming images. Such downtime arises almost without relation to the adhesion processing. Accordingly, even if the adhesion time is extended during downtime, the extension of the adhesion time will not reduce the throughput.

(6-3-1) Specific Example

Toner purging is an example of an event that produces downtime. Toner purging is control performed to maintain the cleaning performance of the cleaning blade 71. In the image forming apparatus 100, when a predetermined starting condition is satisfied, the process cartridges 7*n*, 7*y*, 7*m*, and 7*c* supply toner to the transfer belt 30, and the transfer belt 30 conveys the toner to the cleaning blade 71. The predetermined starting condition is, for example, that the number of sheets on which images have been formed in succession has reached a threshold number. By periodically supplying toner to the cleaning blade 71, the coefficient of friction between the cleaning blade 71 and the transfer belt 30 is kept within an appropriate range. This makes cleaning problems less likely to occur.

It is difficult to purge toner and form images at the same time. This is because if toner is purged while an image is being formed, an unintended image will be formed on the sheet S. Accordingly, the image forming apparatus 100 temporarily extends an image formation interval and purges toner during the extended image formation interval. The "image formation interval" is, for example, a distance from the following end of the preceding sheet S to the leading end of the subsequent sheet S, or a time corresponding to that distance (a conveyance time). The image forming apparatus 100 cannot form images while toner is being purged. This results in downtime.

Another event that causes the downtime is cooldown control (cooling control) performed to suppress a rise in the internal temperature of the image forming apparatus 100. The condition for starting the cooldown control is, for example, that the internal temperature exceeds a threshold temperature, the number of sheets S on which images have been formed in succession exceeds a threshold number, or the like. The cooldown control can include, for example, extending the image formation interval or temporarily stopping image formation.

Another event that causes downtime is calibration. "Calibration" is control that corrects the image density, the image formation position, or the like when a predetermined starting condition is satisfied.

Still another event that causes downtime is the remaining amount of toner being detected. The "remaining amount of toner being detected" refers to detecting the remaining amount of toner contained in the process cartridge 7.

A throughput priority mode and an environment priority mode may be provided as adhesion modes of the image forming system 1. Conditions under which downtime arises may be satisfied while the image forming system 1 is manufacturing a booklet in the throughput priority mode. When such a condition under which downtime arises is satisfied, the image forming apparatus 100 switches the adhesion mode from the throughput priority mode to the environment priority mode. In other words, the image forming apparatus 100 operates in the environment priority mode during downtime. The throughput priority mode is, for example, a mode in which a high amount of adhesive toner Tn is applied and the adhesion time is short. On the other hand, the environment priority mode is, for example, a mode in which a low amount of adhesive toner Tn is applied and the adhesion time is long.

(6-4) Control System

Figure 5:
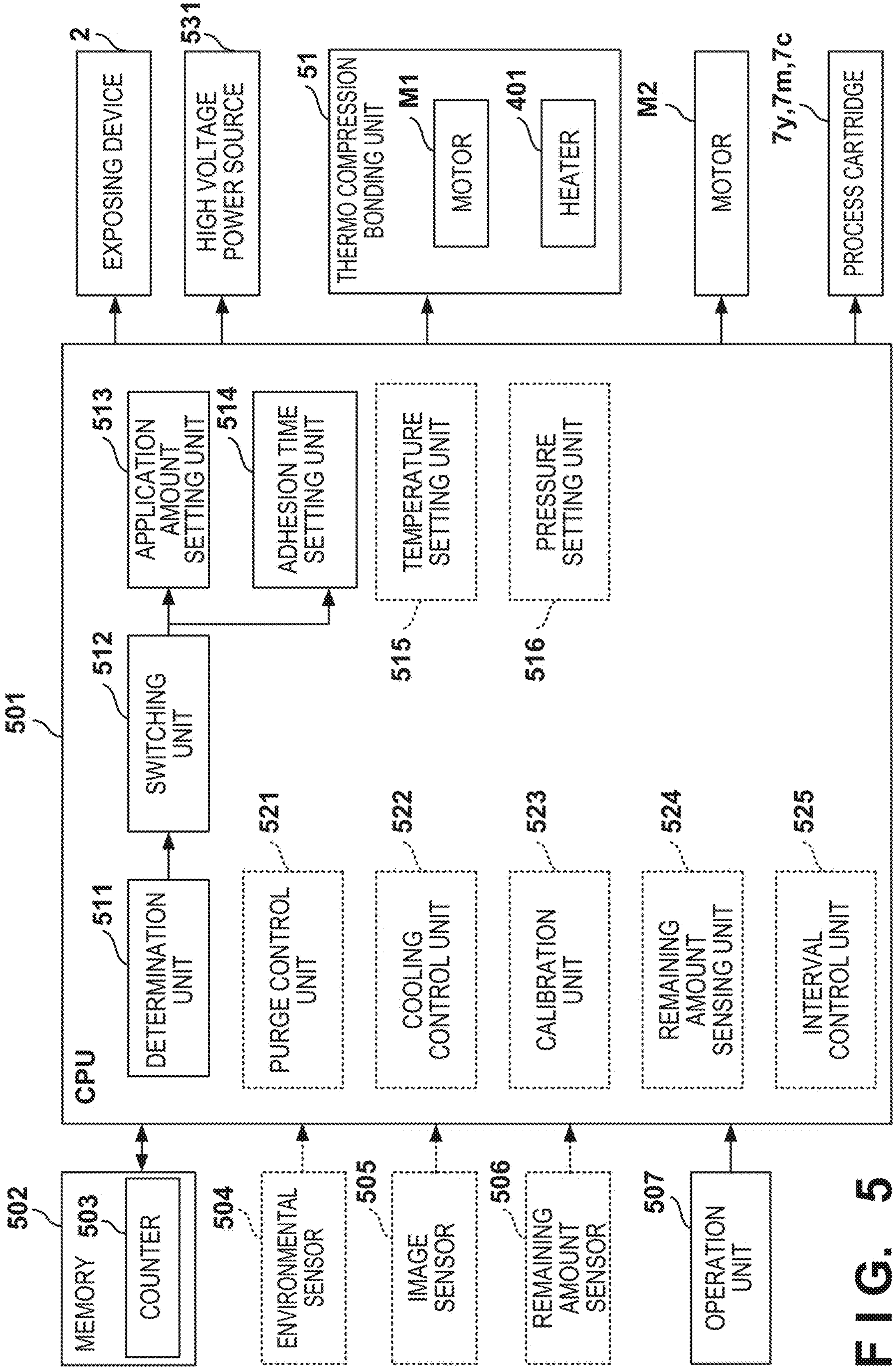
FIG. 5 is a diagram illustrating functions of a CPU.

FIG. 5 illustrates a control system of the image forming system 1. The broken lines indicate optional functions. A CPU 501 implements various functions by executing a control program stored in a memory 502. Some or all of these functions may be implemented by hardware circuitry such as application-specific integrated circuits (ASICs) or field-programmable gate arrays (FPGAs). The memory 502 is a storage device that can include a read-only memory (ROM), a random access memory (RAM), a hard disk drive (HDD), a solid-state drive (SSD), or the like. A counter 503 counts a total number of sheets S on which images have been formed in succession.

An environmental sensor 504 is a sensor that senses the temperature or humidity of the environment in which the image forming apparatus 100 is installed, or the internal temperature of the image forming apparatus 100. An image sensor 505 is an image sensor that reads a test image formed on the photosensitive drum D, the transfer belt 30, or the sheet S. A remaining amount sensor 506 is a sensor that senses the remaining amount of toner contained in the process cartridge 7. An operation unit 507 includes a display that displays information to a user and a touch device (an input apparatus) used by the user to input information.

A high-voltage power source 531 generates a charging bias (a charging voltage) supplied to the charging roller C and a developing bias (a developing voltage) supplied to the developing roller of the developing apparatus K. The CPU 501 can adjust the maximum darkness of the toner image by adjusting the charging bias or the developing bias.

The thermocompression bonding unit 51 includes a motor M1 that drives the pressurizing lever 404, and the heater 401. A motor M2 rotationally drives the feed roller 81, for example.

The CPU 501 has a plurality of adhesion modes. A determination unit 511 determines whether a switching condition for switching the adhesion mode is satisfied. For example, the determination unit 511 may determine whether a condition under which downtime arises is satisfied. A switching unit 512 switches the adhesion mode based on the determination result from the determination unit 511. An application amount setting unit 513 sets an application amount corresponding to the adhesion mode set by the switching unit 512 in the exposure apparatus 2 corresponding to the process cartridge 7*n*. The application amount is set in the exposure apparatus 2 because the application amount of the adhesive toner Tn changes according to the exposure amount. Note that the application amount may be changed by adjusting the charging bias or the developing bias of the process cartridge 7*n*. For example, the amount of adhesive toner Tn applied to the photosensitive drum Dn may be changed by changing a potential difference between the surface potential of the exposed region on the photosensitive drum Dn and the surface potential of the developing roller of the developing apparatus Kn. An adhesion time setting unit 514 sets an adhesion time (heating and pressurizing time) corresponding to the adhesion mode set by the switching unit 512 in the thermocompression bonding unit 51.

A temperature setting unit 515 sets a target temperature of the heater 401 of the thermocompression bonding unit 51. A pressure setting unit 516 sets the pressure applied by the pressurizing lever 404 of the thermocompression bonding unit 51.

A purge control unit 521 starts purging toner in accordance with the count value of the counter 503. The purge control unit 521 controls the process cartridges 7*y*, 7*m*, and 7*c*, and the transfer belt 30, to perform the toner purge.

A cooling control unit 522 starts the cooldown control when the internal temperature sensed by the environmental sensor 504 exceeds a threshold temperature. When the cooldown control is started, the cooling control unit 522 may instruct an interval control unit 525 to increase the image formation interval. The internal temperature gradually drops as a result.

A calibration unit 523 starts calibration when the count value of the counter 503 reaches a predetermined threshold. The calibration unit 523 controls the image forming apparatus 100 to form a test image on the sheet S. The calibration unit 523 causes the image sensor 505 to read the test image, and then corrects the image darkness, the image formation position, and the like based on the result of the reading. A remaining amount sensing unit 524 senses the remaining amount of toner contained in the process cartridges 7*n*, 7*y*, 7*m*, and 7*c* using the remaining amount sensor 506.

The interval control unit 525 controls the image formation interval by controlling the timing at which the motor M2 operates. For example, curling may arise in the sheet S as the sheet S traverses the fixing apparatus 6. Curling arising in the sheet S is reduced by the user switching the image formation interval from a normal interval to a long image formation interval through the operation unit 507. Feeding and conveying a plurality of sheets S at this long image formation interval may be called a "curling suppression mode".

(6-5) Specific Example of Control Method

As one example, when the number of sheets S on which an image is formed is at least a predetermined threshold, the CPU 501 switches the adhesion mode and purges the toner. The threshold number is set to 30 sheets, for example. In the toner purge, the toners Ty, Tm, and Tc are conveyed to the cleaning blade 71 by the transfer belt 30. The downtime caused by the toner purge is 1.0 seconds, for example.

The counter 503 includes a purge counter Cp. 1 is added to the count value of the purge counter Cp each time an image is formed on a single sheet S. The CPU 501 (the determination unit 511) determines whether the purge counter Cp is at least a predetermined threshold Cpth (e.g., 30). When the purge counter Cp is at least the predetermined threshold Cpth, the CPU 501 purges the toner in accordance with the timing at which the thermocompression bonding unit 51 performs the adhesion processing. Once the toner purge is complete, the CPU 501 resets the purge counter Cp to 0.

Figure 6A:
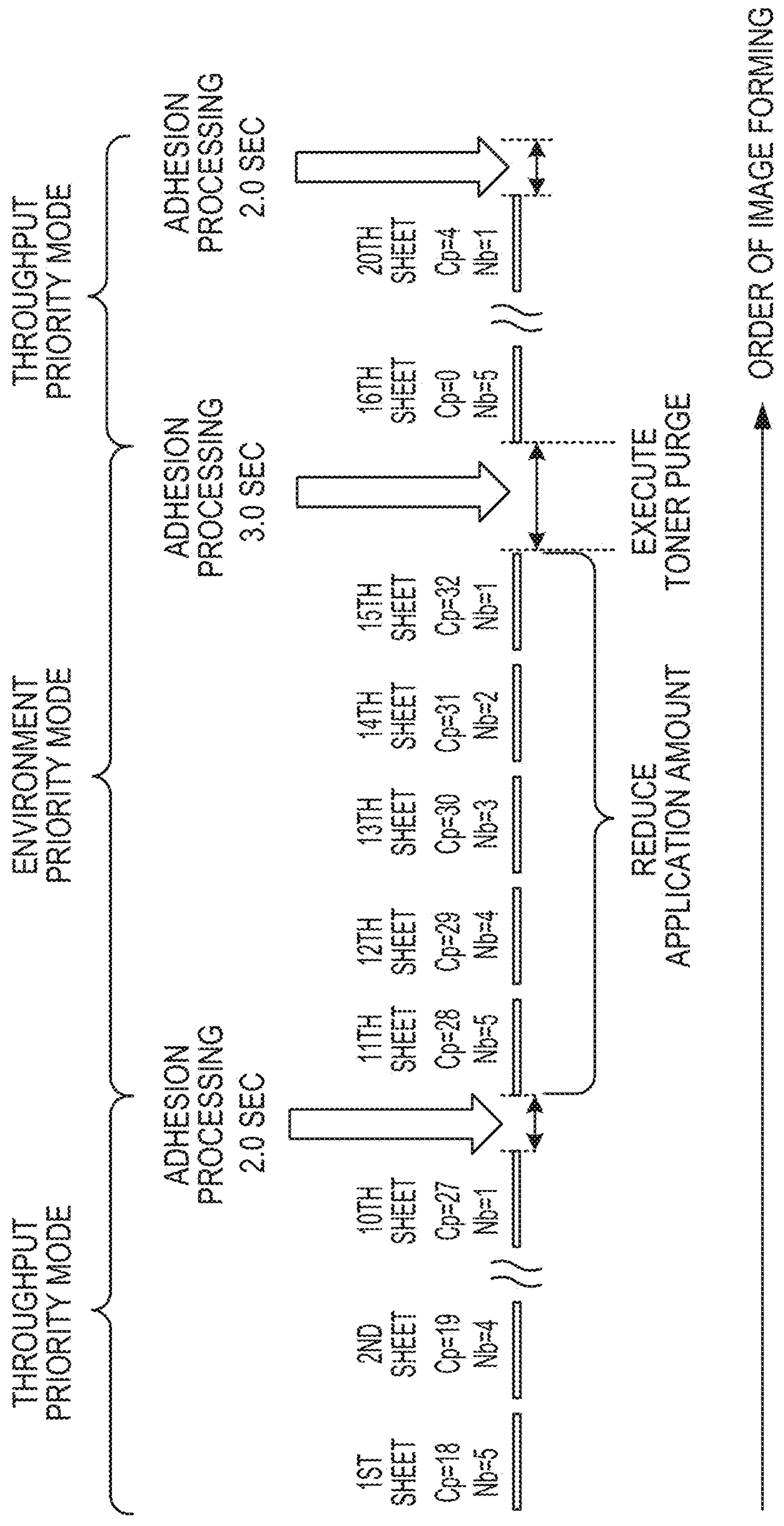
FIGS. 6A and 6B are diagrams illustrating the switching of an adhesion mode.

FIG. 6A is a diagram illustrating the timing and adhesion conditions for a toner purge. Assume, as an example, that a booklet having 20 sheets S is manufactured. The post-processing apparatus 130 performs the adhesion processing every five sheets S. The count value of the purge counter Cp at the start of printing is assumed to be 18. The threshold Cpth is 30 sheets. Nb indicates the number of sheets S until the next adhesion processing is performed. When the adhesion processing is performed, Nb is reset to a predetermined value (e.g., five sheets). Note that Nb is a countdown-type counter that decreases by one every sheet S.

The purge counter Cp is incremented each time an image is formed on a sheet S. The adhesion time after the fifth sheet S and the adhesion time after the tenth sheet S are both 2.0 seconds. This is because the count value of the purge counter Cp is less than the threshold Cpth. The toner is therefore not purged.

On the other hand, the adhesion time after the 15th sheet S is set to 3.0 seconds. This is because the count value of the purge counter Cp is at least the threshold Cpth. The CPU 501 therefore purges the toner. The purge counter Cp is then reset to 0. The adhesion time after the 20th sheet S is 2.0 seconds. This is because the count value of the purge counter Cp is less than 30. The toner is therefore not purged. In this manner, the CPU 501 (the determination unit 511) determines whether to purge the toner based on the count value of the purge counter Cp when performing the adhesion processing.

The CPU 501 furthermore extends the adhesion time during the period when toner is being purged. The CPU 501 reduces the amount of adhesive toner Tn applied to the five sheets S that are to be adhered after this extended adhesion time.

(6-6) Flowchart

Figure 7:
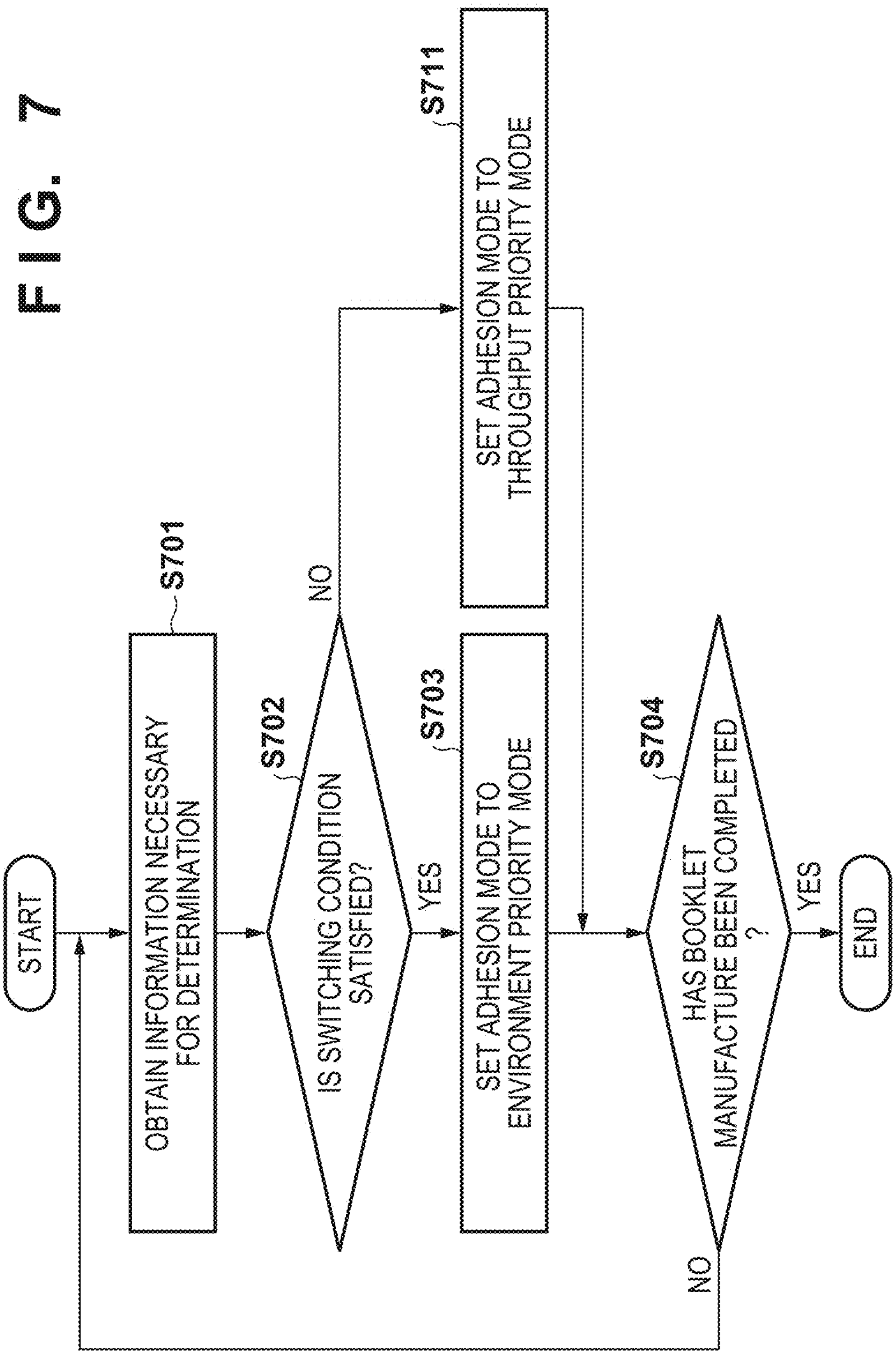
FIG. 7 is a flowchart illustrating a method for switching the adhesion mode.

FIG. 7 illustrates a control method executed by the CPU 501 in accordance with a control program. The CPU 501 executes the following processing when the adhesive toner Tn is applied.

In step S701, the CPU 501 (the determination unit 511) obtains information necessary for determining whether to switch the adhesion mode. For example, the determination unit 511 reads out the count value of the purge counter Cp from the memory 502.

In step S702, the CPU 501 (the determination unit 511) determines whether a switching condition is satisfied based on the obtained information. For example, the determination unit 511 may make the determination using the following equations.

$$Cp \geq Cmth \qquad \text{Eq1}$$

$$Cmth = Cpth - Nb \qquad \text{Eq2}$$

Here, "Cmth" represents a threshold that defines the switching condition for switching the adhesion mode. "Cp" represents the count value of the purge counter Cp. "Cpth" represents the threshold for purging toner (e.g., 30 sheets). The CPU 501 performs the adhesion processing and the toner purging in parallel at the timing of the first adhesion processing, which arrives after Cp becomes at least Cpth.

According to FIG. 6A, Cp=27 and Cmth=29 at the point in time when the adhesive toner Tn is applied to the tenth sheet S. The switching condition is therefore not satisfied. However, Cp=28 and Cmth=25 at the point in time when the adhesive toner Tn is applied to the 11th sheet S. The switching condition is therefore satisfied. Once the switching condition is satisfied, the CPU 501 moves the sequence from step S702 to step S703.

In step S703, the CPU 501 (the switching unit 512) sets the adhesion mode to the environment priority mode. For example, the application amount is set to 0.40 mg/cm$^2$. The adhesion time is set to 3.0 seconds. The CPU 501 then moves the sequence from step S703 to step S704.

On the other hand, if the switching condition is not satisfied in step S702, the CPU 501 moves the sequence from step S702 to step S711.

In step S711, the CPU 501 (the switching unit 512) sets the adhesion mode to the throughput priority mode. For example, the application amount is set to 0.45 mg/cm$^2$. The adhesion time is set to 2.0 seconds. The CPU 501 then moves the sequence from step S711 to step S704.

In step S704, the CPU 501 determines whether booklet manufacture has been completed. If the booklet manufacture production is incomplete, the CPU 501 returns the sequence to step S701 from step S704. If the booklet manufacture is complete, however, the CPU 501 ends the control method.

Note that the condition for performing the adhesion processing is that the number of sheets S that have arrived at the thermocompression bonding unit 51 has reached a predetermined number (e.g., five sheets). The condition for starting toner purging is that the adhesion mode is set to the environment priority mode and the thermocompression bonding unit 51 has started the adhesion processing. Alternatively, the condition for starting toner purging is that the purge counter Cp is at least the threshold Cpth, and a predetermined number (e.g., five) of the sheets S have been conveyed to the intermediate stacking section 42.

In this manner, the amount of the adhesive toner applied and the adhesion time (heating/pressurization time) may be determined based on the count value of the purge counter Cp.

Incidentally, images cannot be formed while toner is being purged. This results in downtime (e.g. 1.0 seconds of downtime). In other words, when toner is purged, a time lag of 1.0 seconds arises when the sheet S is conveyed from the image forming apparatus 100 to the post-processing apparatus 130. However, the manufacturing time for the booklet when toner is purged and the adhesion time is 2.0 seconds is the same as the manufacturing time for the booklet when toner is purged and the adhesion time is 3.0 seconds. This is because a one-second delay will always occur as long as toner is being purged.

On the other hand, the adhesion strength between the plurality of sheets S in the booklet increases as the adhesion time increases. This is because longer adhesion times result in an increase in the amount of heat applied to the adhesive toner Tn, which causes the adhesive toner Tn to melt more appropriately. In other words, the adhesion force acting between the toner particles is increased. The toner also penetrates the gaps between paper fibers in the sheet S. This produces what is known as an "anchoring" effect, which increases the adhesion force.

In terms of the relationship between the amount of adhesive toner Tn applied and the adhesion strength, a lower application amount results in a lower adhesion strength. This is because as the amount of adhesive toner Tn applied decreases, more of the surfaces of the two adjacent sheets S are in direct contact without toner interposed therebetween. This causes a drop in adhesion. In particular, the adhesion decreases as the smoothness of the sheet S decreases, i.e., as the unevenness of the surface of the sheet S increases.

When the amount of adhesive toner Tn applied to the sheet S is reduced in order to consume less adhesive toner Tn, the adhesion strength between the sheets S decreases. Accordingly, in the first embodiment, the adhesion strength is maintained by extending the adhesion time. In other words, the adhesion strength between the sheets S is maintained even when the amount of adhesive toner Tn applied is reduced. However, simply extending the adhesion time will increase the time required to manufacture the booklet. Accordingly, in the first embodiment, the adhesion time is extended in conjunction with the downtime arising in the image forming apparatus 100. This maintains the booklet manufacturing time and reduces the amount of the adhesive toner Tn consumed. The environmental performance of the booklet manufacturing apparatus is improved as a result.

Incidentally, depending on the material and the like of the sheet S, the sheet S may be discolored or deformed under prolonged heating and pressure. The CPU 501 may set an upper limit time for the adhesion time in accordance with the type of the sheet S as designated by the user through the operation unit 507. In other words, the CPU 501 may adjust the application amount in accordance with the upper limit time, which is set according to the type of the sheet S. Note that the memory 502 may hold a table storing upper limit times according to types of the sheet S, and a table storing relationships between upper limit times and application amounts. The CPU 501 may determine the upper limit time and the application amount using these tables.

However, if the amount of adhesive toner Tn applied is extremely low, the adhesion strength will be insufficient regardless of how long the adhesion time is extended. The CPU 501 therefore determines the amount by which the adhesive toner Tn is to be reduced in accordance with the time by which the adhesion time is extended, within a range in which the adhesion strength can be maintained.

(6-7) Booklet Manufacturing Conditions and Performance Evaluation

The results of a performance evaluation test on booklets, carried out to confirm the effects of the first embodiment, will be described here. In the performance evaluation test, various combinations of amounts of adhesive toner Tn applied and adhesion times were prepared, and the adhesion strength of the booklet was compared with the application amount of adhesive toner Tn that was consumed in manufacturing the booklet.

A booklet constituted by 20 sheets S was produced in the evaluation test. At this time, the count value of the purge counter Cp at the start of printing was 18. As illustrated in FIG. 6A, toner was purged after an image was formed on the 15th sheet S.

In the first embodiment, the environment priority mode was applied to the 11th to 15th sheets S in accordance with the timing of the toner purge. In other words, the application amount was set to 0.40 mg/cm$^2$. The adhesion time for the adhesion processing performed when the 15th sheet S was conveyed to the thermocompression bonding unit 51 was set to 3.0 seconds.

In Comparative Example I, the application amount is 0.45 mg/cm$^2$, and the adhesion time is 2.0 seconds. In other words, in Comparative Example I, the throughput priority mode is applied even during toner purging. In Comparative Example II, the application amount is 0.40 mg/cm$^2$, and the adhesion time is 2.0 seconds.

FIG. 8A illustrates a booklet 800 that was manufactured. A test piece 801 was cut from the booklet 800. The short side of the test piece 801 was 20 mm. The long side of the test piece 801 was 50 mm.

FIG. 8B illustrates the testing environment. A holding member 811 on the upper side held the first to 13th sheets S in the test piece 801. A holding member 812 on the lower side held the 14th to 20th sheets S. A digital force gauge 813 (FGP-2, manufactured by Nidec Shimpo) was further connected to the upper holding member 811. The digital force gauge 813 was gradually pulled upward, and the value measured by the digital force gauge 813 (the adhesion strength) was obtained when the sheets S were peeled off.

An adhesion strength of at least 1.0 N/cm in each unit of distance in the width direction of the test piece 801 is sufficient. Therefore, in the evaluation test, adhesion strengths of at least 1.0 N/cm were determined to pass. Adhesion strengths less than 1.0 N/cm were determined to fail.

The adhesion strength was measured in the section between the 13th and 14th sheets S because that section is the section is where the application amount and the adhesion time are changed between Comparative Example I, Comparative Example II, and the first embodiment. In other words, the greatest difference in the adhesion strength arises in this section.

The amount of adhesive toner Tn consumed to manufacture the booklet 800 was calculated from the difference between the weight of a powder containment part of the developing apparatus K from before the booklet 800 was manufactured and the weight of the powder containment part of the developing apparatus K after the booklet 800 was manufactured.

Red Label Presentation (manufactured by Canon; A4 size) was used as evaluation paper. The pressure applied was 0.2 MPa for an average contact pressure. The surface temperature of the heating plate 402 was 200° C.

FIG. 9 shows the evaluation results. The application amount and the adhesion time are those from when toner was being purged. When toner was not being purged, the application amount was the normal amount (0.45 mg/cm$^2$), and the adhesion time was also the normal time (2.0 seconds).

In Comparative Example I, the throughput priority mode was maintained even while toner was being purged, and thus the application amount was high and the adhesion time was short. The adhesion strength was 1.0 N/cm. The evaluation result was therefore a pass. 195 mg of toner was consumed to manufacture the booklet 800.

In Comparative Example II, the application amount was low and the adhesion time was short. Because the application amount of the adhesive toner Tn was low, 189 mg of toner was consumed to manufacture the booklet 800. However, because the amount applied to the 11th to 15th sheets S was low, the adhesion strength of the booklet 800 was 0.8 N/cm. The evaluation result was therefore a fail.

The application amount in the first embodiment was low. 189 mg of toner was consumed to manufacture the booklet 800. However, the adhesion time was 3.0 seconds. The adhesion strength was 1.0 N/cm. The evaluation result was therefore a pass. In the first embodiment, the adhesion time was extended in accordance with the toner purge. Accordingly, the booklet manufacturing time was the same in Comparative Example I, Comparative Example II, and the first embodiment. In this manner, the first embodiment makes it possible to reduce toner consumption while maintaining the booklet manufacturing time and adhesion strength.

In the first embodiment, the adhesion time is extended and the amount of adhesive toner Tn applied is reduced in accordance with downtime arising in the image forming apparatus 100. In other words, the adhesion mode is switched from the throughput priority mode to the environment priority mode in synchronization with the occurrence of downtime. This reduces the amount of toner consumed and improves the environmental performance of the image forming system 1. The frequency at which the process cartridge 7*n* need to be replaced is also reduced, and thus the usability is also improved. Furthermore, the cost of manufacturing the booklet is reduced, which will improve the usability.

Figure 6B:
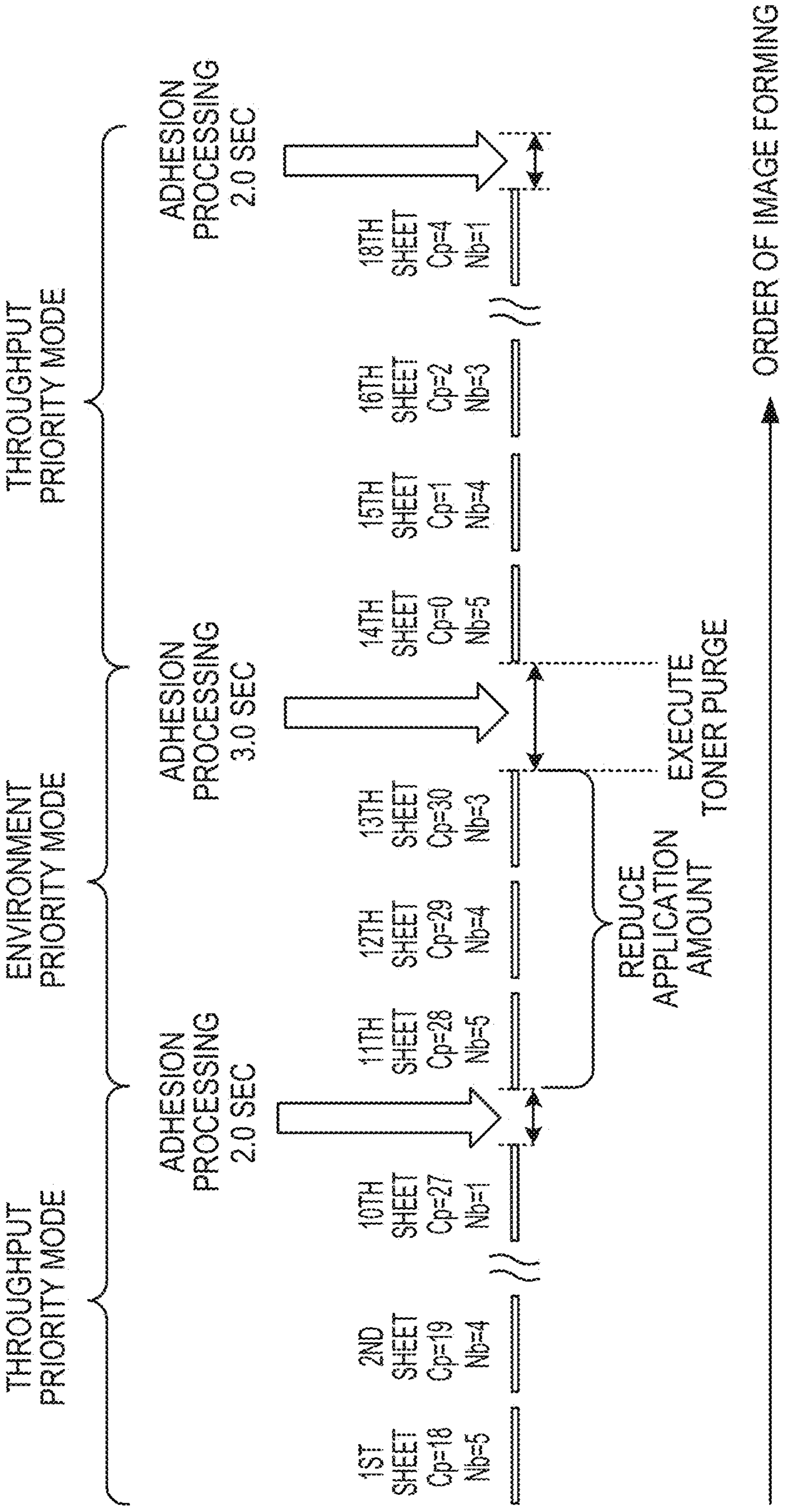

In the first embodiment, the adhesion processing and the toner purge are performed in synchronization with each other. Specifically, toner is purged in conjunction with the first instance of adhesion processing performed after the count value of the purge counter Cp exceeds the threshold. However, this is merely one example. As illustrated in FIG. 6B, the toner purge and the adhesion processing may be performed simultaneously at the point where the purge counter Cp exceeds a predetermined threshold, in order to prioritize the cleaning performance of the cleaning blade 71. In other words, instead of the adhesion processing being executed every five sheets S, the adhesion processing may be executed for fewer than five sheets S in accordance with the timing of the toner purge. When the adhesion processing is applied to a sheet bundle W constituted by fewer than five sheets S, the adhesion required less heat. The CPU 501 may therefore lower the temperature of the heating plate 402 more, lower the pressure more, or further reduce the application amount.

The first embodiment describes toner purging as an example of an event that causes downtime. However, the environment priority mode may be applied in conjunction with other events, such as the cooldown control, calibration, and remaining toner amount detection. At that time, the time by which the adhesion time is extended is set to be no greater than the downtime caused by the event.

Second Embodiment

(1) Basic Concept

A second embodiment will describe an extension of the image formation interval as an event that causes downtime. The image forming apparatus 100 feeds a plurality of sheets S at an image formation interval such that a pre-set target throughput can be achieved. However, a sheet S which has been placed in a highly humid environment may curl when the sheet S traverses the fixing apparatus 6. In such a case, the user switches an operating mode of the image forming apparatus 100 from a normal mode (a non-curling suppression mode) to a curling suppression mode using the operation unit 507. In other words, the user prioritizes the quality of the booklet quality over the time required to manufacture the booklet, and selects the curling suppression mode (low throughput) as the operating mode. Reducing curls improves the alignment of the sheets S in the thermocompression bonding unit 51, which improves the quality of the booklet.

The image formation interval is longer in the curling suppression mode than in the normal mode. The CPU 501 can therefore set the adhesion time in the curling suppression mode longer than in the normal mode. The CPU 501 can also set the application amount in the curling suppression mode to be lower than in the normal mode. In the second embodiment, the descriptions from the first embodiment will be used for matters common with the first embodiment.

(2) Application Amount and Adhesion Time in Curling Suppression Mode

The difference between the image formation interval in the curling suppression mode and the image formation interval in the non-curling suppression mode is 1.0 seconds. In other words, the adhesion time in the curling suppression mode (e.g., 3.0 seconds) is extended by 1.0 seconds over the adhesion time in the non-curling suppression mode (e.g., 2.0 seconds). The booklet manufacturing time in the curling suppression mode therefore stays the same even when the adhesion time is extended by 1.0 seconds in the curling suppression mode.

Accordingly, the CPU 501 (the adhesion time setting unit 514) extends the adhesion time of the adhesion processing performed each time a predetermined number (e.g., five) of sheets S are conveyed to the thermocompression bonding unit 51 by about 1.0 seconds. Furthermore, the CPU 501 (the application amount setting unit 513) reduces the amount of adhesive toner Tn applied to all the sheets S in the curling suppression mode. For example, if the application amount in the non-curling suppression mode is 0.45 $mg/cm^2$, the application amount in the curling suppression mode is reduced to 0.40 $mg/cm^2$.

In the curling suppression mode, the amount of adhesive toner Tn applied to the sheet S is low, but the adhesion time is extended. The adhesion strength is therefore maintained. The adhesion time is also extended within the range of the time by which the image formation interval is extended. The booklet manufacturing time is therefore also maintained. In this manner, the amount of adhesive toner Tn used can be reduced, which improves the environmental performance of the image forming system 1.

(3) Flowchart

Figure 10:
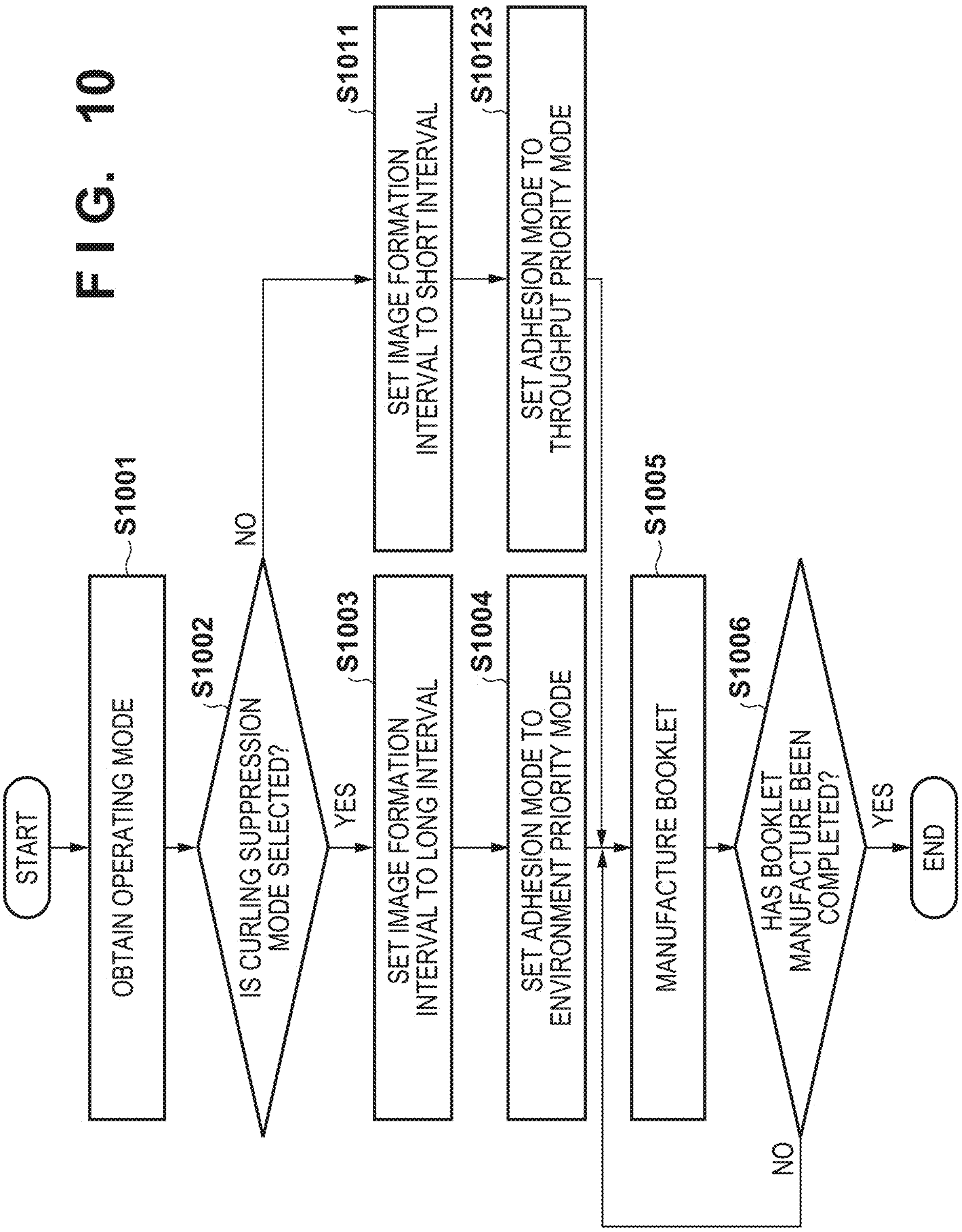
FIG. 10 is a flowchart illustrating a method for manufacturing a booklet including switching the adhesion mode.

FIG. 10 illustrates a control method according to the second embodiment, executed by the CPU 501.

In step S1001, the CPU 501 (the determination unit 511) obtains the operating mode as information necessary to make a determination. The operating mode is selected by the user, for example, using the operation unit 507.

In step S1002, the CPU 501 (the determination unit 511) determines whether the operating mode is the curling suppression mode. If the operating mode is the curling suppression mode, the CPU 501 moves the sequence from step S1002 to step S1003.

In step S1003, the CPU 501 (the interval control unit 525) sets the image formation interval to a long interval.

In step S1004, the CPU 501 (the switching unit 512) sets the adhesion mode to the environment priority mode. As a result, the application amount setting unit 513 reduces the application amount. The adhesion time setting unit 514 also increases the adhesion time. The CPU 501 then moves the sequence from step S1004 to step S1005.

On the other hand, when the non-curling suppression mode is selected in step S1002, the CPU 501 moves the sequence from step S1002 to step S1011. In step S1011, the CPU 501 (the interval control unit 525) sets the image formation interval to a short interval.

In step S1012, the CPU 501 (the switching unit 512) sets the adhesion mode to the throughput priority mode. As a result, the application amount setting unit 513 increases the application amount. The adhesion time setting unit 514 also reduces the adhesion time. The CPU 501 then moves the sequence from step S1012 to step S1005.

In step S1005, the CPU 501 controls the image forming apparatus 100 and the post-processing apparatus 130 to manufacture a booklet. For example, the image forming apparatus 100 forms corresponding images on each of 20 sheets S, and discharges the 20 sheets in sequence to the post-processing apparatus 130. The post-processing apparatus 130 performs the adhesion processing each time five of the sheets S arrive at the thermocompression bonding unit 51.

In step S1006, the CPU 501 determines whether booklet manufacture has been completed. For example, the CPU 501 determines that the booklet manufacture has been completed when a booklet is discharged to the lower tray 37.

In this manner, in the second embodiment, the adhesion time and the application amount are set based on the image formation interval. In the second embodiment, the amount of adhesive toner Tn applied to all the sheets S is lower than in the first embodiment. Accordingly, the second embodiment further reduces the amount of toner consumed.

The second embodiment describes a "curling suppression mode", in which the image formation interval is extended, as an example. However, the technical spirit of the second embodiment can be applied in any image forming system 1 having a plurality of operating modes with different image formation intervals. In other words, when an operating mode that uses a relatively long image formation interval is selected, the adhesion time is extended and the application amount is reduced.

For example, the user may prioritize reducing toner consumption over booklet manufacturing time. In this case, the CPU 501 may further extend the image formation interval and further reduce the amount of toner consumed (a consumption priority mode).

Third Embodiment

(1) Basic Concept

The first and second embodiments improve the environmental performance of the image forming system 1 by extending the adhesion time and reducing the application amount. A third embodiment reduces the target temperature of the heater 401 in addition to extending the adhesion time and reducing the application amount. This makes it possible to extend the lifespan of the heater 401, which improves the environmental performance of the image forming system 1.

Reducing the target temperature of the heater 401 improves the durability of components in the thermocompression bonding unit 51, such as the heater 401, the heating plate 402, and the pressurizing plate 406. For example, the temperature reduction suppresses deterioration of a silicon rubber plate used as the pressurizing plate 406.

However, when the target temperature of the heater 401 drops, the amount of heat applied to the adhesive toner Tn per unit of time may drop as well, leading to a drop in the adhesion strength between the sheets S. Accordingly, in the third embodiment, the total amount of heat applied to the adhesive toner Tn is maintained by extending the adhesion time, which maintains the adhesion strength.

As described in the first and second embodiments, when downtime (e.g., an extension of the image formation interval) arises in the image forming apparatus 100, the adhesion time setting unit 514 extends the adhesion time, and the application amount setting unit 513 reduces the application amount. Furthermore, the temperature setting unit 515 reduces the target temperature of the heater 401. This reduces the amount of adhesive toner Tn consumed and improves the durability of the thermocompression bonding unit 51 without increasing the booklet manufacturing time.

The amount of reduction in the adhesive toner Tn and the amount of reduction in the target temperature of the heater 401 are determined in advance based on the adhesion strength required for the booklet, the toner consumption, and the target lifespan of the thermocompression bonding unit 51. Combinations of adhesion times, application amounts, and target temperatures based on downtimes (e.g., image formation intervals) are held in the memory 502. The CPU 501 reads out, from the memory 502, the combination of the adhesion time, application amount, and target temperature that corresponds to the specified downtime or image formation interval.

When reducing the amount of adhesive toner Tn consumed is prioritized, a high temperature is set as the target temperature of the heater 401, and the application amount is set to a low amount. Conversely, when the durability of the thermocompression bonding unit 51 is prioritized, the target temperature of the heater 401 is set to a low temperature, and the application amount is set to a high amount. In these cases, the adhesion time is extended to ensure sufficient adhesion strength. Note that if sufficient adhesion strength is ensured, the target temperature of the heater 401 and the application amount may be balanced without extending the adhesion time.

If the user only wishes to improve the durability of the thermocompression bonding unit 51, the target temperature of the heater 401 may be reduced significantly, without reducing the application amount. In this case, the adhesion time is extended to ensure sufficient adhesion strength.

(2) Flowchart

The flowchart in the third embodiment is the same as the flowcharts in the first and second embodiments. However, the target temperature of the heater 401 in the environment priority mode is lower than in the throughput priority mode.

In this manner, in the third embodiment, the target temperature of the heater 401 is reduced in addition to extending the adhesion time and reducing the amount of adhesive toner Tn applied. This provides the effects described in the first and second embodiments, and also improves the durability of the thermocompression bonding unit 51.

Fourth Embodiment

(1) Basic Concept

The first and second embodiments basically improve the environmental performance of the image forming system 1 by extending the adhesion time and reducing the application amount. The third embodiment improves the durability of the heater 401 by reducing the temperature of the heater 401. A fourth embodiment reduces the pressure of the pressurizing lever 404 in addition to extending the adhesion time and reducing the application amount. This makes it possible to extend the lifespan of the thermocompression bonding unit 51, which improves the environmental performance of the image forming system 1. More specifically, reducing the pressure improves the durability of the heater 401, the heating plate 402, the pressurizing plate 406, and the like. For example, reducing the pressure suppresses deformation of the silicon rubber plate serving as the pressurizing plate 406. The power consumption of the motor M1 that drives the pressurizing lever 404 is also reduced. This improves the environmental performance of the image forming system 1.

However, reducing the pressure also reduces the adherence between particles of the adhesive toner Tn, and between the sheet S and the adhesive toner Tn. This may result in an increase in the contact thermal resistance, a drop in the amount of heat applied to the adhesive toner Tn per unit of time, and a drop in the adhesion strength between the sheets S. Accordingly, in the fourth embodiment, the total amount of heat applied to the adhesive toner Tn is maintained by extending the adhesion time, which maintains the adhesion strength. This improves the durability of the thermocompression bonding unit 51 and also maintains the adhesion strength.

As described in the first to third embodiments, when downtime (e.g., an extension of the image formation interval) arises, the adhesion time can be extended, and the application amount can be reduced. In the fourth embodiment too, the pressure is reduced at the timing at which the adhesion time is extended as described in the first to third embodiments. This maintains the booklet manufacturing time and improves the durability of the thermocompression bonding unit 51. The consumption of the adhesive toner Tn and the power consumption are also reduced, as described in the first to third embodiments.

The amount of reduction in the adhesive toner Tn and the amount of reduction in the pressure are determined in advance based on the adhesion strength required for the booklet, the toner consumption, and the target lifespan of the thermocompression bonding unit 51. Combinations of adhesion times, application amounts, and pressures (and target temperatures, as an option) based on downtimes (e.g., image formation intervals) are held in the memory 502. The CPU 501 reads out, from the memory 502, the combination of the adhesion time, application amount, and pressure (and target temperature, if used) that corresponds to the specified downtime or image formation interval.

When reducing the amount of adhesive toner Tn consumed is prioritized, a high value may be set for the pressure, and the application amount may be set to a low amount. Conversely, when the durability of the thermocompression bonding unit 51 is prioritized, a low value may be set for the pressure, and the application amount may be set to a high amount. If the user only wishes to improve the durability of the thermocompression bonding unit 51, pressure may be reduced significantly, without reducing the application amount.

(2) Flowchart

The flowchart in the fourth embodiment is the same as the flowcharts in the first, second, and third embodiments. However, the pressure for the environment priority mode set by the pressure setting unit 516 is lower than the pressure for the throughput priority mode.

In this manner, in the fourth embodiment, the pressure of the pressurizing lever 404 is reduced in addition to extending the adhesion time and reducing the amount of adhesive toner Tn applied. This provides the effects described in the first, second, and third embodiments, and also improves the durability of the thermocompression bonding unit 51.

Note that one of the pressure and the application amount may be reduced, and the other may be increased, to keep the adhesion time and the adhesion strength constant. Additionally, at least one of the pressure or the application amount may be reduced, and the adhesion time may be extended, to maintain the adhesion strength.

Other

(1) Parameters for Improving Environmental Performance and Parameters for Improving Throughput As described above, the application amount, the target temperature of the heater 401, the pressure of the pressurizing lever 404, and the adhesion time have been given as parameters related to environmental performance and throughput. Reducing the application amount, the target temperature, or the pressure improves the environmental performance, whereas increasing one of these items improves the throughput. Extending the adhesion time can improve the environmental performance. Reducing the adhesion time improves the throughput. Accordingly, the environment priority mode and the throughput priority mode are formed by combining at least two of these four parameters. In other words, all four parameters may be combined as appropriate, three of the four parameters may be combined as appropriate, or two of the four parameters may be combined as appropriate to ensure sufficient adhesion strength. In this manner, as long as the adhesion strength is maintained and the environmental performance is improved, the selection of the adhesion time, the application amount, the temperature of the heater 401, and the pressure may be combined with the selection of the increase or decrease of the values thereof as desired.

(2) Overview of Adhesive Toner Tn

A toner containing a thermoplastic resin may be employed as the adhesive toner Tn according to the first to fourth embodiments, for example. Publicly-known thermoplastic resins such as, for example, polyester resin, vinyl resin, acrylic resin, styrene acrylic resin, polyethylene, polypropylene, polyolefin, ethylene-vinyl acetate copolymer resin, and ethylene-acrylic acid copolymer resin can be given as examples of the thermoplastic resin. The toner may contain a plurality of such resins.

The adhesive toner Tn may further contain wax. A publicly-known wax such as, for example, an ester wax that is an ester of alcohol and acid, a hydrocarbon wax such as paraffin wax, or the like may be used as the wax.

The adhesive toner Tn may contain a colorant. A publicly-known colorant such as a black colorant, a yellow colorant, a magenta colorant, or a cyan colorant can be used as the colorant.

The adhesive toner Tn may contain a magnetic material, a charge control agent, a wax, and an external additive. To form the adhesive part from adhesive toner on the sheet S using the electrophotographic method, the weight average particle diameter of the adhesive toner Tn is at least 5.0 μm and at most 30 μm. Note that the weight average particle diameter may be at least 6.0 μm and at most 20 μm. A printing toner may be used as the adhesive toner Tn as long as the toner satisfies the adhesion requirements.

(3) Arrangement of Post-Processing Apparatus

Figure 11:
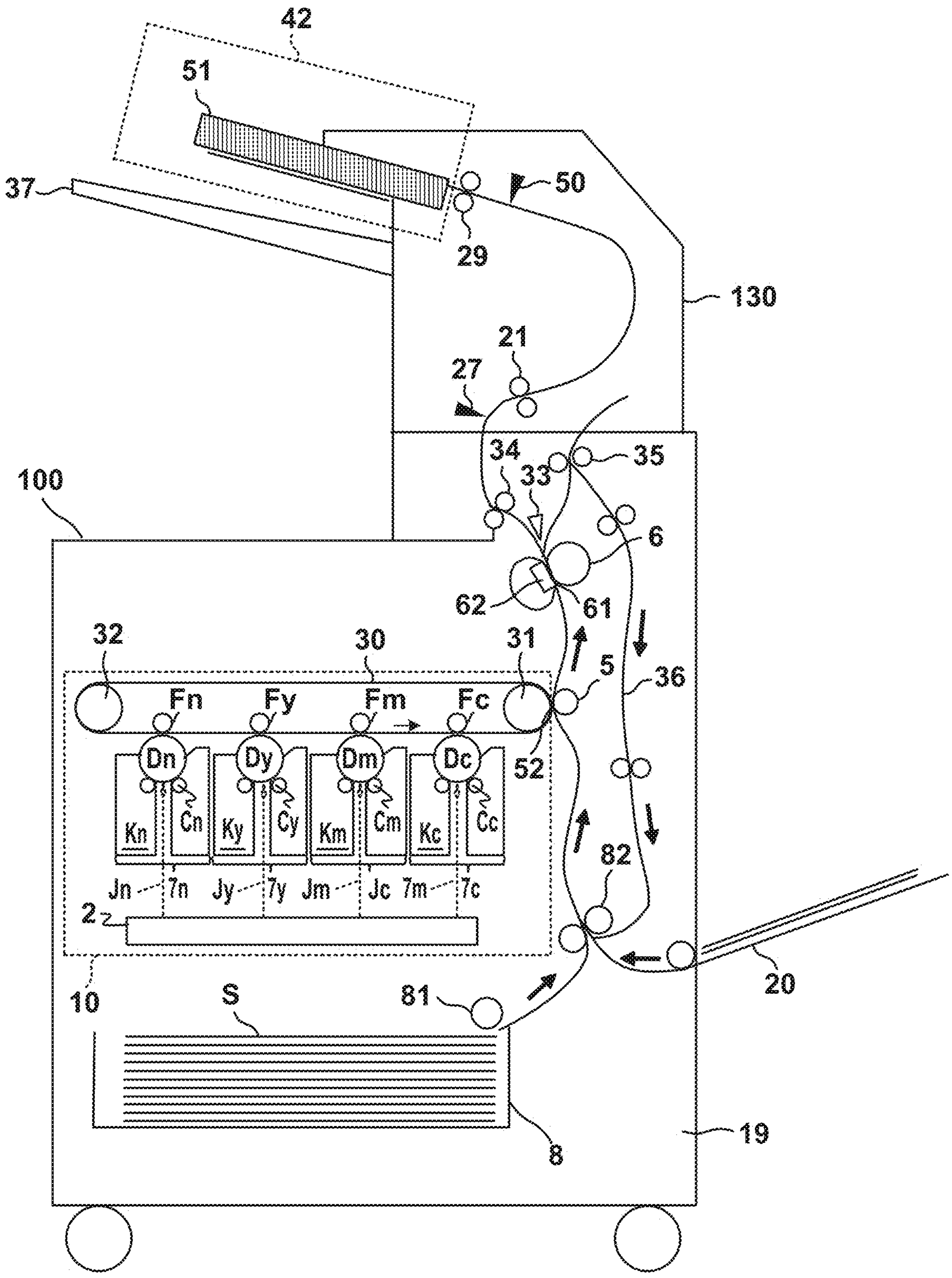
FIG. 11 is a diagram illustrating an image forming system (a booklet manufacturing apparatus).

Although FIG. 1 illustrates the post-processing apparatus 130 having the thermocompression bonding unit 51 as being disposed next to the image forming apparatus 100, this is merely an example. As illustrated in FIG. 11, the post-processing apparatus 130 and the thermocompression bonding unit 51 may be disposed in an upper part of the main body of the image forming apparatus 100.

Technical Spirit Derived from Embodiments (Item 1)

As described in the first and second embodiments, the amount of adhesive toner Tn applied is reduced in the environment priority mode. This improves the environmental performance of the booklet manufacturing apparatus. Note, however, that if the application amount is reduced, the adhesion strength can drop. Accordingly, the amount of heat supplied to the sheets S in the thermocompression bonding unit 51 is increased. This maintains the adhesion strength while improving the environmental performance. Note that the amount of heat may be adjusted according to at least one of the temperature of the heater 401 and the heating time. The temperature, heating time, and adhesion time of the heater 401 are examples of heat parameters proportional to the amount of heat supplied to the plurality of sheets.

(Item 2)

The adhesion strength of the booklet may be maintained by extending the adhesion time (the heating time) according to the reduction in the application amount.

(Item 3)

As described in the third embodiment, the durability of the heater 401 may be improved by reducing the temperature of the heater 401. This further improves the environmental performance of the booklet manufacturing apparatus. In addition, both the application amount and the temperature of the heater 401 may be reduced. In either case, the required adhesion strength is achieved by extending the adhesion time.

(Item 4)

Reducing the application amount to improve the environmental performance also reduces the adhesion strength. Accordingly, the CPU 501 may increase the adhesion strength by increasing the temperature of the heater 401. A sufficient adhesion strength may be ensured for the booklet as a result. In this case, the CPU 501 may keep the adhesion time constant. In other words, the CPU 501 can reduce the amount of toner applied even if no downtime arises.

(Item 5)

Pressure and heat may be applied to the sheet S simultaneously, as is the case with the thermocompression bonding unit 51. This adheres the plurality of sheets S efficiently.

(Item 6)

As described in the fourth embodiment, the pressure of the pressurizing lever 404 may be reduced in the environment priority mode. This improves the durability of the pressurizing lever 404 and improves the environmental performance of the image forming system 1. Note that the CPU 501 increases the adhesion time in accordance with the amount of reduction in the application amount and the decrease in the applied pressure. This also maintains the adhesion strength of the booklet.

(Item 7)

As illustrated in FIG. 6A, there is a tradeoff between the environmental performance and the throughput. Accordingly, the CPU 501 may select the adhesion mode in accordance with the throughput. For example, the CPU 501 reduces the throughput as the internal temperature of the image forming apparatus 100 rises. The CPU 501 may set the adhesion mode to the environment priority mode during the period when the throughput is decreasing. This improves the environmental performance of the image forming system 1. Note, however, that when the internal temperature of the image forming apparatus 100 drops, the CPU 501 increases the throughput. The CPU 501 also sets the adhesion mode to the throughput priority mode.

(Item 8)

In the embodiments, the downtime is time arising more in cases when the throughput drops than in cases where the image forming apparatus 100 stops completely (e.g., a sheet jam). When downtime occurs, the booklet manufacturing time increases. However, the increase in the booklet manufacturing time is not caused by the thermocompression bonding unit 51. Accordingly, the CPU 501 increases the adhesion time by utilizing downtime arising independently of the thermocompression bonding unit 51. In other words, the adhesion time is also extended by utilizing the fact that the booklet manufacturing time is increased by the downtime. It is therefore not the case that the booklet manufacturing time is increased due to the extension of the adhesion time.

(Item 9)

The transfer belt 30 is an example of a member involved in forming images. Cleaning control is necessary to maintain the quality of the images printed on the sheets S. Downtime arises when the cleaning control is started. Accordingly, the adhesion time may be extended using this downtime.

(Item 10)

When the internal temperature of the image forming apparatus 100 rises, the CPU 501 reduces the throughput, and lowers the internal temperature of the image forming apparatus 100. Accordingly, the adhesion time may be extended by using downtime arising for the purpose of lowering the internal temperature.

(Item 11)

As described in the first embodiment and the like, toner is purged in accordance with the purge counter Cp. Accordingly, the adhesion time may be extended by using downtime involved in the toner purging.

(Item 12)

The image forming apparatus 100 performs calibration to maintain the quality of the images formed on the sheets S (e.g., the image darkness and the image formation position). Accordingly, the adhesion time may be extended by using downtime involved in the calibration. The quality of the image may also be called "image formation performance".

(Item 13)

The image forming apparatus 100 senses the remaining amount of toner held in the process cartridge 7*n* using the remaining amount sensor 506. To detect the remaining amount more accurately, it is necessary to stop image formation, which causes downtime. Accordingly, the adhesion time may be extended by using downtime involved in detecting the remaining amount of toner. The toner is an example of a consumable.

(Item 14)

As described in the second embodiment, there are situations where it is necessary to increase the image formation interval. The CPU 501 may extend the adhesion time using processing time secured by increasing the image formation interval.

(Item 15)

As described in the second embodiment, expanding the image formation interval is effective in reducing curling arising in the sheets S. Accordingly, when a mode for suppressing curling is selected, the adhesion mode may be set to the environment priority mode.

(Item 16)

As illustrated in FIG. 6A, the thermocompression bonding unit 51 may perform the adhesion processing (heating processing and pressing processing) each time a predetermined number of sheets S arrive at the intermediate stacking section 42. In other words, the timing at which a condition for performing an event that causes downtime is satisfied does not necessarily coincide with the timing at which the adhesion processing is performed. In this case, the CPU 501 may perform the adhesion processing at the timing of the earliest instance of the adhesion processing.

(Item 17)

As illustrated in FIG. 6B, when a condition for performing an event that causes downtime is satisfied, the adhesion processing may be performed along with that event. In this case, the thermocompression bonding unit 51 need not wait for the predetermined number of sheets S to arrive at the intermediate stacking section 42. In this case, the CPU 501 may reduce the application amount, lower the temperature of the heater 401, or reduce the pressure, in accordance with the number of sheets S actually stacked on the intermediate stacking section 42.

(Item 18)

The adhesion time at which the sheet S will deform depends on the material of the sheet S. Accordingly, the CPU 501 may determine the adhesion time in each adhesion mode according to the material of the sheet S.

(Item 19)

The CPU 501 may determine the combination of a first value (e.g., the adhesion time or the temperature of the heater 401) and the application amount in accordance with the adhesion strength required for the booklet. The adhesion strength required for a booklet varies depending on the purpose of the booklet. As such, the CPU 501 may determine the combination of the adhesion time, the temperature of the heater 401, the pressure, and the application amount in accordance with the adhesion strength required for the booklet.

(Item 20)

As mentioned in the fourth embodiment and the like, there is a tradeoff between the pressure and the application amount. Accordingly, when the application amount is reduced, the adhesion strength required for the booklet is kept at the target strength by increasing the pressure. This reduces the amount of toner consumed. On the other hand, when the pressure is reduced, the adhesion strength required for the booklet is kept at the target strength by increasing the application amount. The durability of the thermocompression bonding unit 51, and the environmental performance of the image forming system 1, may be improved as a result.

(Item 21)

As mentioned in the third embodiment, there is a tradeoff between the adhesion time and the temperature of the heater 401. A drop in the temperature of the heater 401 improves the durability of the thermocompression bonding unit 51, but may reduce the adhesion strength. Accordingly, when the temperature of the heater 401 drops, the adhesion time may be increased to maintain the adhesion strength required for the booklet. The environmental performance of the image forming system 1 may be improved as a result.

(Item 22)

As mentioned in the fourth embodiment, there is a tradeoff between the adhesion time and the pressure. Accordingly, the CPU 501 may increase the adhesion time when the pressure is reduced to improve the durability of the thermocompression bonding unit 51. The environmental performance of the image forming system 1 may be improved as a result.

(Item 23)

The image forming system 1 having a booklet manufacturing apparatus (e.g., a post-processing apparatus 130) and an image forming apparatus may be provided.

(Item 24)

As described with reference to FIGS. 2A to 2C, the process cartridge 7*n* and the transfer unit 3 apply a powder adhesive to the binding margin.

(Item 25)

The image forming section 10 and an electrophotographic process may be used to apply the powder adhesive to the sheet S.

(Item 26)

As described above, in the environment priority mode, any one of the application amount, the heat amount (heating temperature and heating time), and the pressure is set to a value that improves the environmental performance. In this case, the adhesion strength will drop. Accordingly, the other control parameters are set so as to increase the adhesion strength. This improves the environmental performance while keeping the adhesion strength at the target strength. For example, if the application amount is reduced, the heating time, heating temperature, or pressure is increased. When the heating temperature is reduced, the heating time is increased. When the pressure is reduced, the heating time is increased.

Note that in the throughput priority mode, any one of the application amount, the heat amount (heating temperature and heating time), and the pressure is set to a value that improves the throughput. In this case, the adhesion strength will drop. Accordingly, the other control parameters are set so as to increase the adhesion strength. This improves the throughput while keeping the adhesion strength at the target strength. For example, when the heating time is reduced, one of the application amount, the heating temperature, or the pressure is increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-126436, filed Aug. 2, 2023 which is hereby incorporated by reference herein in its entirety.

What is claimed is:

1. A booklet manufacturing apparatus comprising:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, wherein the controller has a first adhesion mode and a second adhesion mode, the first adhesion mode is a mode in which an application amount of the powder adhesive applied to the binding margin is a first application amount and a heat parameter proportional to an amount of heat applied to the plurality of sheets by the heater is a first value, the second adhesion mode is a mode in which the application amount of the powder adhesive applied to the binding margin is a second application amount and the heat parameter is a second value, the first value is higher than the second value, and the first application amount is lower than the second application amount.

2. The booklet manufacturing apparatus according to claim 1, wherein the heat parameter is a heating time for which the heater heats the plurality of sheets, the first value is a first heating time, and the second value is a second heating time, and the heater is further configured to:

heat the plurality of sheets for the first heating time in the first adhesion mode; and heat the plurality of sheets for the second heating time in the second adhesion mode.

3. The booklet manufacturing apparatus according to claim 2, wherein the heater is further configured to:

heat the plurality of sheets at a first temperature in the first adhesion mode; and heat the plurality of sheets at a second temperature in the second adhesion mode, and the first temperature is lower than the second temperature.

4. The booklet manufacturing apparatus according to claim 1, wherein the heat parameter is a temperature of the heater, the first value is a first temperature, and the second value is a second temperature, and the heater is further configured to:

heat the plurality of sheets at the first temperature in the first adhesion mode; and heat the plurality of sheets at the second temperature in the second adhesion mode.

5. The booklet manufacturing apparatus according to claim 1, wherein the pressing member is further configured to apply pressure to the plurality of sheets in parallel with the heater heating the plurality of sheets.

6. The booklet manufacturing apparatus according to claim 5, wherein a pressure applied to the plurality of sheets by the pressing member in the first adhesion mode is lower than a pressure applied to the plurality of sheets by the pressing member in the second adhesion mode.

7. The booklet manufacturing apparatus according to claim 1, wherein the booklet manufacturing apparatus is connected to an image forming apparatus that forms images on the plurality of sheets and supplies the plurality of sheets to the booklet manufacturing apparatus, the controller is further configured to:

select the first adhesion mode when a throughput, the throughput being a number of sheets on which the image forming apparatus forms an image per unit of time, is a first throughput; and select the second adhesion mode when the throughput of the image forming apparatus is a second throughput, and the first throughput is lower than the second throughput.

8. The booklet manufacturing apparatus according to claim 7, wherein when downtime during which the image forming apparatus cannot form an image arises in the image forming apparatus, the controller switches from the second throughput to the first throughput.

9. The booklet manufacturing apparatus according to claim 8, wherein the downtime arises in response to at least one of the following:

control related to cleaning a member involved in forming the images in the image forming apparatus;

a rise in an internal temperature of the image forming apparatus;

a number of sheets on which images are formed in succession by the image forming apparatus;

performing calibration for maintaining image formation performance of the image forming apparatus; and sensing a remaining amount of a consumable used to form the images in the image forming apparatus.

10. The booklet manufacturing apparatus according to claim 1, wherein the booklet manufacturing apparatus is connected to an image forming apparatus that forms images on the plurality of sheets and supplies the plurality of sheets to the booklet manufacturing apparatus, the controller is further configured to:

select the first adhesion mode when an image formation interval corresponding to a distance or a time between a following end of a preceding sheet and a leading end of a subsequent sheet in the image forming apparatus is a first image formation interval; and select the second adhesion mode when the image formation interval in the image forming apparatus is a second image formation interval, and the first image formation interval is longer than the second image formation interval.

11. The booklet manufacturing apparatus according to claim 10, wherein an ability of the first image formation interval to suppress curling in the plurality of sheets is higher than an ability of the second image formation interval to suppressing curling in the plurality of sheets.

12. The booklet manufacturing apparatus according to claim 1, further comprising:

a support member configured to support sheets that are conveyed from an image forming apparatus and that constitute a booklet, wherein each time a predetermined number of sheets are conveyed onto the support member, the heater performs heating processing and the pressing member performs pressing processing, and when a condition for performing an operation that will cause downtime in which the image forming apparatus cannot form an image is satisfied, the controller performs the operation after waiting for the predetermined number of sheets to be conveyed onto the support member.

13. The booklet manufacturing apparatus according to claim 1, further comprising:

a support member configured to support sheets that are conveyed from an image forming apparatus and that constitute a booklet, wherein each time a predetermined number of sheets are conveyed onto the support member, the heater performs heating processing and the pressing member performs pressing processing, and when a condition for performing an operation that will cause downtime in which the image forming apparatus cannot form an image is satisfied, the controller causes the heater to perform the heating processing, causes the pressing member to perform the pressing processing, and performs the operation, before the predetermined number of sheets are conveyed onto the support member.

14. The booklet manufacturing apparatus according to claim 1, wherein the controller is further configured to determine the first value in accordance with a material of the plurality of sheets.

15. The booklet manufacturing apparatus according to claim 1, wherein the controller is further configured to determine a combination of the first value and the application amount in accordance with an adhesion strength required for the booklet.

16. A booklet manufacturing apparatus comprising:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, wherein the controller has a first adhesion mode and a second adhesion mode, the first adhesion mode is a mode in which an application amount of the powder adhesive applied to the binding margin is a first application amount and a pressure of the pressing member is a first pressure, the second adhesion mode is a mode in which the application amount of the powder adhesive applied to the binding margin is a second application amount and the pressure of the pressing member is a second pressure, the first pressure is higher than the second pressure, and the first application amount is lower than the second application amount.

17. A booklet manufacturing apparatus comprising:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, wherein the controller has a first adhesion mode and a second adhesion mode, the first adhesion mode is a mode in which a time for which the heater heats the plurality of sheets is a first heating time, and a temperature of the heater is a first temperature, the second adhesion mode is a mode in which the time for which the heater heats the plurality of sheets is a second heating time, and the temperature at which the heater heats the plurality of sheets is a second temperature, the first heating time is longer than the second heating time, and the first temperature is lower than the second temperature.

18. A booklet manufacturing apparatus comprising:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, wherein the controller has a first adhesion mode and a second adhesion mode, the first adhesion mode is a mode in which a time for which the heater heats the plurality of sheets is a first heating time, and a pressure of the pressing member is a first pressure, the second adhesion mode is a mode in which the time for which the heater heats the plurality of sheets is a second heating time, and the pressure of the pressing member is a second pressure, the first heating time is longer than the second heating time, and the first pressure is lower than the second pressure.

19. An image forming system comprising a booklet manufacturing apparatus and an image forming apparatus, wherein the image forming apparatus includes:

an image forming unit configured to form images on a plurality of sheets; and a discharge roller configured to discharge the plurality of sheets to the booklet manufacturing apparatus, the booklet manufacturing apparatus includes:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, the controller has a first adhesion mode and a second adhesion mode, the first adhesion mode is a mode in which an application amount of the powder adhesive applied to the binding margin is a first application amount and a heat parameter proportional to an amount of heat applied to the plurality of sheets by the heater is a first value, the second adhesion mode is a mode in which the application amount of the powder adhesive applied to the binding margin is a second application amount and the heat parameter is a second value, the first value is higher than the second value, and the first application amount is lower than the second application amount.

20. The image forming system according to claim 19, wherein the image forming apparatus includes an application unit configured to apply the powder adhesive to each binding margin of the plurality of sheets.

21. The image forming system according to claim 20, wherein the powder adhesive is toner.

22. An image forming apparatus comprising:

an image forming unit configured to form images on a plurality of sheets;

an application unit configured to apply a powder adhesive to a binding margin of each of the plurality of sheets;

a discharge roller configured to discharge the plurality of sheets to a booklet manufacturing apparatus; and a controller configured to control the application unit, wherein the booklet manufacturing apparatus includes:

a heater configured to heat the plurality of sheets to which a powder adhesive has been applied in the binding margin of each of the sheets; and a pressing member configured to manufacture the booklet by applying pressure to the plurality of sheets heated by the heater, the controller has a first adhesion mode and a second adhesion mode, the first adhesion mode is a mode in which an application amount of the powder adhesive applied to the binding margin is a first application amount and a heat parameter proportional to an amount of heat applied to the plurality of sheets by the heater is a first value, the second adhesion mode is a mode in which the application amount of the powder adhesive applied to the binding margin is a second application amount and the heat parameter is a second value, the first value is higher than the second value, and the first application amount is lower than the second application amount.

23. A booklet manufacturing apparatus comprising:

a heater configured to heat a plurality of sheets to which a powder adhesive has been applied in a binding margin of each of the sheets;

a pressing member configured to manufacture the booklet by applying pressure to the plurality of sheets heated by the heater; and a controller configured to control the heater and the pressing member, wherein the controller has a first adhesion mode and a second adhesion mode, each having a plurality of control parameters, the plurality of control parameters include an application amount of the powder adhesive to the binding margin, an amount of heat applied by the heater, and a pressure applied by the pressing member, in the first adhesion mode, at least one control parameter among the plurality of control parameters is set to a corresponding first value, and another at least one control parameter among the plurality of control parameters is set to a corresponding second value, in the second adhesion mode, at least one control parameter among the plurality of control parameters is set to a corresponding third value, and another at least one control parameter among the plurality of control parameters is set to a corresponding fourth value, a combination of the first value and the second value is set such that an adhesion strength of the powder adhesive achieves a target strength, and an environmental performance of at least one of the powder adhesive, the heater, and the pressing member is better than the combination of the third value and the fourth value, and the combination of the third value and the fourth value is set such that the adhesion strength of the powder adhesive achieves the target strength, and a manufacturing time of the booklet made from the plurality of sheets is better than the combination of the first value and the second value.

24. The booklet manufacturing apparatus according to claim 23, wherein in the first adhesion mode, the application amount is set to the first value and the heat amount is set to the second value to improve the environmental performance of the powder adhesive, in the second adhesion mode, the application amount is set to the third value and the heat amount is set to the fourth value to improve the manufacturing time of the booklet, the first value is lower than the third value, and the second value is higher than the fourth value.

25. The booklet manufacturing apparatus according to claim 23, wherein in the first adhesion mode, a heating temperature of the heater is set to the first value and a heating time of the heater is set to the second value to improve the environmental performance of the heater, in the second adhesion mode, the heating temperature of the heater is set to the third value and the heating time of the heater is set to the fourth value to improve the manufacturing time of the booklet, the first value is lower than the third value, and the second value is higher than the fourth value.

26. The booklet manufacturing apparatus according to claim 23, wherein in the first adhesion mode, a pressure of the pressing member is set to the first value and a heating time of the heater is set to the second value to improve the environmental performance of the pressing member, in the second adhesion mode, the pressure of the pressing member is set to the third value and the heating time of the heater is set to the fourth value to improve the manufacturing time of the booklet, the first value is lower than the third value, and the second value is higher than the fourth value.

* * * * *